US012630159B2

(12) United States Patent
Nasir et al.

(10) Patent No.: US 12,630,159 B2
(45) Date of Patent: May 19, 2026

(54) DISTURBANCE COMPENSATION

(71) Applicant: NVIDIA Corporation, Santa Clara, CA (US)

(72) Inventors: Mohammed Nasir, San Jose, CA (US); Vishal Murali, Santa Clara, CA (US); Yue Sun, Danville, CA (US)

(73) Assignee: NVIDIA Corporation, Santa Clara, CA (US)

( * ) Notice: Subject to any disclaimer, the term of this patent is extended or adjusted under 35 U.S.C. 154(b) by 131 days.

(21) Appl. No.: 18/065,484

(22) Filed: Dec. 13, 2022

(65) Prior Publication Data

US 2024/0190435 A1 Jun. 13, 2024

(51) Int. Cl.
B60W 30/18 (2012.01)
B60W 40/10 (2012.01)
(52) U.S. Cl.
CPC ............ B60W 30/18 (2013.01); B60W 40/10 (2013.01)
(58) Field of Classification Search
CPC .............................. B60W 30/18; B60W 40/10
See application file for complete search history.

(56) References Cited

U.S. PATENT DOCUMENTS

| | | |
|---|---|---|
| 2005/0107895 A1 | 5/2005 | Pistikopoulos et al. |
| 2013/0253821 A1* | 9/2013 | Joseph .................. G06F 3/0346 |
| | | 701/501 |

| | | |
|---|---|---|
| 2019/0100217 A1 | 4/2019 | Livshiz et al. |
| 2019/0322268 A1* | 10/2019 | Leone ................... F02D 41/029 |
| 2019/0389505 A1 | 12/2019 | Pramod et al. |
| 2022/0048522 A1* | 2/2022 | Hamagami ........... B60W 40/09 |

FOREIGN PATENT DOCUMENTS

| | | |
|---|---|---|
| DE | 602 23 253 T2 | 11/2008 |
| DE | 10 2016 015 268 A1 | 6/2018 |
| DE | 10 2018 123 818 A1 | 4/2019 |
| DE | 10 2019 116 667 A1 | 12/2019 |
| EP | 3339117 A1 | 6/2018 |

OTHER PUBLICATIONS

German Office Action issued in corresponding application No. 10 2023 134 313.0, dated Oct. 22, 2025.

* cited by examiner

*Primary Examiner* — Seth A Silverman
(74) *Attorney, Agent, or Firm* — Sanders IP Law

(57) ABSTRACT

The present disclosure relates to determining an observed state of a system based at least on sensor data generated using one or more sensors of the system. The present disclosure further relates to generating disturbance data based at least on comparing an estimated state of the system with the observed state of the system. The present disclosure further relates to updating one or more disturbance terms of a state space formulation based at least on the disturbance data. The present disclosure further relates to generating, based at least on the state space formulation, a control command that directs one or more operations of the system according to plan data indicative of a plan for completing one or more tasks of the system.

19 Claims, 9 Drawing Sheets

Application Layer
540

Application(s)
542

Software Layer
530

Software
532

Framework Layer
520

Job Scheduler
533

Configuration
Manager 534

Distributed File System
538

Resource Manager
536

Data Center Infrastructure Layer
510

Resource Orchestrator
512

Grouped Computing Resources
514

Node C.R.
516(1)

Node C.R.
516(2)

Node C.R.
516(N)

DISTURBANCE COMPENSATION

BACKGROUND

Vehicles, robots, climate control systems, manufacturing systems, production systems, and other machine and/or system types may use control systems to facilitate performance of one or more tasks. For example, the control system may generate one or more control commands that may direct the system to execute one or more planned operations. In some instances, the planned operations may include directions for performance of operations using one or more components of the system as controlled using the control system.

With reference to an autonomous or semi-autonomous driving or control, development of a control system to track a given trajectory or path generally follow two different approaches. One approach is classical control—such as proportional integral derivative (PID)—which takes in one or more error terms and characterizes the control output as a simple mathematical function of the error inputs. Another approach is optimization-based control—such as linear quadratic regulator (LQR) or model predictive control (MPC)—which seeks to optimize a planned trajectory given the current and future error inputs.

However, there are a number of challenges that are faced when designing such controllers. One challenge is the presence of external disturbances in the system—such as a gust of wind on a tractor-trailer causing an external lateral force or driving on uneven ground causing a torque about the yaw axis. Each respective disturbance negatively affects the objectives of the controller attempting to minimize the amount of lateral cross-track error and heading error.

Existing error compensation measures generally require tracking an error state of the vehicle or machine over time, and separate from a state space used for generating control outputs. As such, the error is then applied to the control outputs to compensate for steady state errors caused by disturbances. The drawback of these types of approaches is that disturbances are rarely constant or in a steady state, thus making the tracking or accumulation over time error prone or inaccurate. In addition, the compensation process introduces an additional process or operation after the generation of the control outputs, thus adding delay to the system, and reducing the ability of these systems for deployment in real-time or near real-time use cases.

SUMMARY

According to one or more embodiments of the present disclosure, systems or operations may compensate for disturbances that may be experienced by a system during performance of a task. In particular, a disturbance may be detected based on a comparison between different states of the system and corresponding disturbance data may be generated. In these or other embodiments, the disturbance data may be used in conjunction with plan data for the system task and state data of the system as part of determining and generating control commands for the system. As such, the disturbance and its effects on the plan and the state may be considered and accounted for in the determined control signals—thus not requiring an additional compensation process or operation after the control commands or signals are generated.

BRIEF DESCRIPTION OF THE DRAWINGS

Example embodiments will be described and explained with additional specificity and detail through the use of the accompanying drawings in which:

Figure 1A:
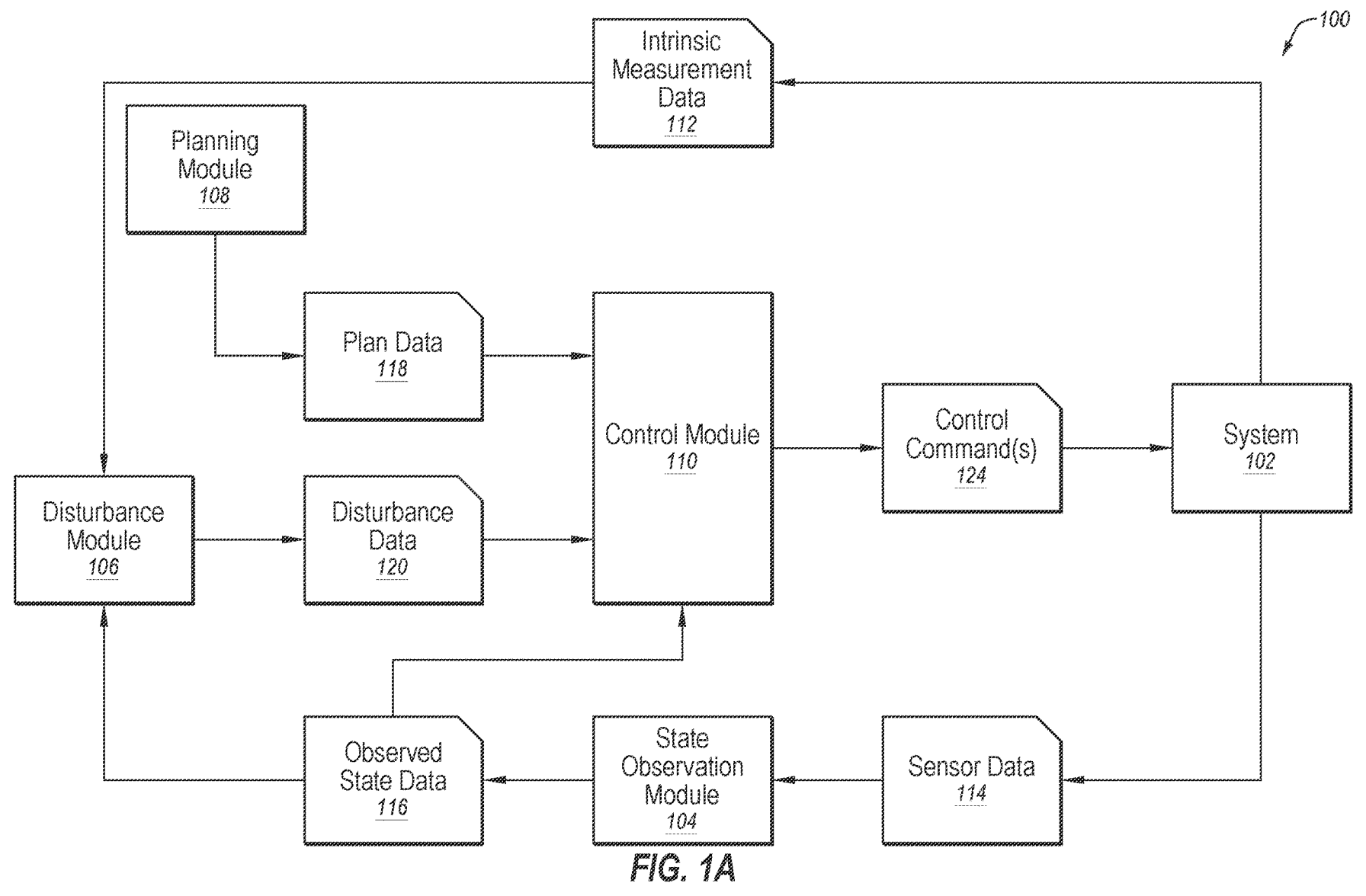

FIGS. 1A-1B illustrate example environments related to generating control commands based on disturbance data, in accordance with some embodiments of the present disclosure;

DETAILED DESCRIPTION

Figure 1B:
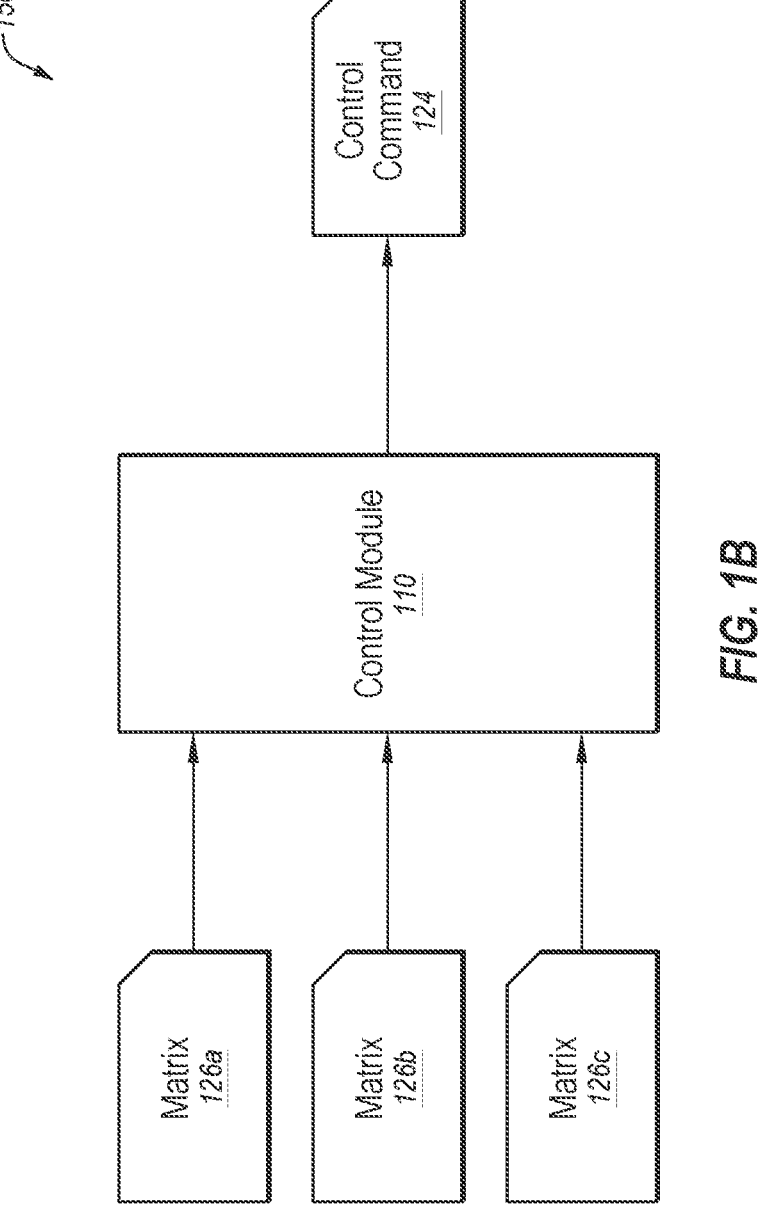

A control system may be implemented as part of a larger system to facilitate performance of a given task. For example, the control system may be used in a number of applications which may include ego-machines such as autonomous vehicles, semi-autonomous vehicles, drones, robots, etc. Further examples of such systems may include climate control systems, manufacturing systems, production systems, etc. In some embodiments, the control system may be configured to cause the execution of operations for performance of a task associated with execution of a plan. In these or other embodiments, the plan may correspond to the system and may include directions for performance of operations using one or more components of the system that may be controlled using the control system.

However, in some instances disturbances may be present that may cause the system to deviate from the planned operations. For example, in the context of an ego-machine navigating on a surface—such as a road—disturbances may include unevenness of the surface, holes, bumps, etc., that when encountered or navigated over by the ego-machine may cause the ego-machine to deviate off its planned course. Another example of disturbances may include gusts of wind that may blow the ego-machine off its planned course.

Systems and methods related to disturbance compensation for control systems are disclosed in the present disclosure. For example, one or more embodiments may relate to generating one or more control commands that may be configured to direct a system to compensate for one or more detected disturbances. For instance, as described in detail in the present disclosure, a disturbance module may be configured to detect one or more disturbances affecting the system based at least on an expected state of the system and an observed state of the system. Additionally or alternatively, a control module may be configured to receive data corresponding to the one or more disturbances detected by the disturbance module. In these and other embodiments, the control module may be configured to generate one or more control commands as an output that may direct the system such that the system may compensate for the disturbances.

The embodiments in the present disclosure may help improve disturbance compensation in control systems, and thus may help to improve control systems themselves. In some circumstances, a control system configured to generate control commands based on using disturbance data as an input may allow the control system to compensate for detected disturbances more effectively. Additionally or alternatively, the control system may be configured to receive plan data corresponding to a plan and sensor data corresponding to an observed system state along with disturbance data as an input. In some embodiments, the combination of inputs may allow the system to complete a given task more quickly and efficiently via model predictive control than a system that may not detect and compensate for the disturbance data or may compensate for disturbance data on a reactionary basis.

In some embodiments, the control system of the present disclosure may generate control commands based actively on disturbance data corresponding to detected disturbances. For example, the control system may generate a control command based on inputs that include plan data corresponding to a plan, sensor data corresponding to an observed vehicle state, and disturbance data corresponding to a detected disturbance. Continuing the example, the control system may generate a control command based on information that a planned course continues straight and a detected disturbance (e.g., a gust of wind) may be pushing the vehicle to the left. Further continuing the example, the control system may generate a control command steering the vehicle to the right thereby keeping the vehicle on the planned course and compensating for the gust of wind. In these and other circumstances, including disturbance data corresponding to detected disturbances as an input to the control module as described in the disclosure may allow the system to complete a given task more efficiently, quickly, and more safely than systems that compensate for disturbance data corresponding to disturbances in a delayed or reactionary manner.

By contrast, unlike the one or more embodiments describing control systems in the present disclosure, some other control systems may include a planner module that may be configured to send information including disturbance data corresponding to potential disturbances to a control module at a number of planner module cycles. Continuing the example, some other control systems may be configured to compensate for potential disturbances between the planner module cycles which may be several time steps after the potential disturbance may have been initially detected. Additionally or alternatively, some other control systems may be configured to compensate for disturbances after having generated control commands. More specifically, as an example, another control system may generate a control command for a vehicle to continue straight on a planned course and, subsequently, the control system may receive disturbance data corresponding to a gust of wind pushing the vehicle to the left. Continuing the example, as a reaction to the disturbance data, the control system may generate a control command to steer the vehicle to the right, into the gust of wind.

One or more of the embodiments disclosed herein may relate to generating one or more control commands that may compensate for one or more detected disturbances where the control commands may be executed by ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous vehicle 300 (alternatively referred to herein as "vehicle 300" or "ego-vehicle") described with respect to FIGS. 3A-3D. In the present disclosure, reference to an "autonomous vehicle" or "semi-autonomous vehicle" may include any vehicle that may be configured to perform one or more autonomous navigation or driving operations. As such, such vehicles may also include vehicles in which an operator is required or in which an operator may perform such operations as well.

Embodiments of the present disclosure may improve upon prior techniques by combining optimization-based control with the benefits of a disturbance observer. To do so, an observer (e.g., a Luenberger observer) may be implemented for fast identification of disturbances—such as by looking at a difference between computed and measured state transitions, and then applying gains that grant a fast convergence. In some embodiments, one or more disturbance terms may be indicated, for example, by disturbance data at one or more time steps such as described with respect to FIGS. 1A and 1B in the present disclosure. Further, the one or more disturbance terms may be specified, for example, as lateral acceleration and yaw acceleration, and may be used to augment the state space formulation, where the state space formulation may include one or more operations to determine one or more state spaces at one or more corresponding time steps. The result of this may include models of the plan and the disturbances in a single formulation. Model Predictive Control (MPC) and/or another process control method may be used to add the disturbance terms as constant inputs to the original state space model in each of the model-predictive operations or time steps of the optimization process. As a result, a control horizon that takes into account disturbances along the whole horizon and is able to compensate for a wide domain of disturbances may be achieved.

For example, the system may implement an observer that determines the external forces and/or moments on a vehicle (or other machine) in the form of lateral and yaw acceleration by a dynamical model. The measured forces may then be used to formulate an additional disturbance term in the state space formulation, in contrast to prior approaches that added an additional state for separately accumulating error over time. The original state space may be held constant with respect to disturbances and the compensation may be performed as an operation in the iterative optimization operation of the MPC. This allows for disturbance information to be used for the entire control horizon, instead of just adding on a term to the current control input.

As a result, the techniques described herein allow for an improvement in lateral trajectory tracking accuracy—measured by cross-track and heading error—in the presence of disturbances such as bank angle, lateral wind, uneven ground, uneven tire wear, and/or the like. During experimentation, the disturbance-rejection performance was proven in simulation and in-vehicle testing when testing with a bank angle used to simulate lateral forces on the vehicle.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

FIG. 1A illustrates an environment 100 related to generating control commands based on disturbance data, in accordance with some embodiments of the present disclosure. In the present example, the environment 100 may be related to compensating for disturbances that may be experienced by an ego-machine with respect to the ego-machine travelling according to a planned trajectory. However, the principles described with respect to the environment 100 may relate to controlling other systems that may be affected by other types of disturbances, such as, but not limited to, those described herein.

In the illustrated example, the environment 100 may include a system 102, state observation module 104, a disturbance module 106, a planning module 108, and a control module 110. In some embodiments, one or more of these modules may be implemented using hardware including one or more processors, central processing units (CPUs) graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In some other instances, one or more of these modules may be implemented using a combination of hardware and software. In the present disclosure, operations described as being performed by a respective module may include operations that the respective module may direct a corresponding computing system to perform. In these or other embodiments, one or more of these modules may be implemented by one or more computing devices, such as that described in further detail with respect to FIG. 4.

In some embodiments, one or more of the modules of FIG. 1A may respectively generate one or more outputs based on one or more inputs. For example, in some embodiments, the inputs and outputs may include intrinsic measurement data 112, sensor data 114, observed state data 116, plan data 118, disturbance data 120, and control command(s) 124. Further, as described in further detail, in some instances, the output of one element of the environment 100 may be used as the input of another element of the environment 100.

The system 102 may include any system or device configured to perform one or more operations. For example, the system 102 may include one or more components of an ego-machine that are configured to cause the ego-machine to perform one or more maneuvers. As another example, the system 102 may include a climate control system configured to control a climate of a particular area, building, or location. As another example, the system 102 may include one or more components configured to control a manufacturing process, a chemical process, etc. The above are merely examples of what the system 102 may include or correspond to. In some embodiments, the system 102 may be configured to perform the operations as part of the performance of one or more tasks. For example, the system 102 may include a vehicle that may be given a task to move from point A to point B. As another example, the system 102 may include a climate control system where the climate control system may be given a task to increase, decrease, or maintain a temperature and/or a humidity level in an environment through some time span.

In some embodiments, the system states at various points in time (e.g., various time steps or time slices) may indicate the behavior of the system 102 with respect to accomplishment of the tasks by the system 102. For example, in the context of a vehicle, a given task may be the vehicle maneuvering from point A to point B, which may be performed over a number of time steps or operations. Continuing the example, a first system state of the vehicle may be determined at time $t_n$ that may include a first position, a first speed, a first acceleration, and/or a first yaw rate. Further continuing the example, a second system state of the vehicle may be determined at time $t_{n+1}$ where the second system state may be different from the first system state and may include a second position, a second speed, a second acceleration, and/or a second yaw rate. An analysis between the first system state and the second system state may indicate how well the vehicle is doing with respect to maneuvering from point A to point B according to, e.g., a plan.

In some embodiments, the system 102 may be configured to perform the one or more operations based on one or more control commands 124 that may be generated by the control module 110. The control module 110 may be configured to generate the control commands 124 as discussed in further detail in the present disclosure.

In some embodiments, the state observation module 104 may be configured to generate observed state data 116. The observed state data 116 may include data that may include one or more characteristics of a state of the system 102. A state of the system 102 ("system state") at a given point in time may describe one or more characteristics or aspects of the system 102 at that given point in time. For example, in the context of the system 102 including a vehicle, the system state may include a motion state of the vehicle that corresponds to motion of the vehicle. The motion state may include one or more motion related characteristics such as a position, a velocity, an acceleration, a yaw rate etc. of the vehicle. As used throughout the disclosure reference to "system state(s)" may accordingly refer to a collection of characteristics, information, and/or variables that describe one or more aspects of the system 102 with respect to one or more points in time.

In some embodiments, the state observation module 104 may be configured to generate the observed state data 116 based on observed characteristics that may be indicated by the sensor data 114. For example, the sensor data 114 may include data that may indicate one or more of the characteristics of the observed state that may be indicated by the observed state data 116. For instance, returning to the example of the system 102 including a vehicle, the sensor data 114 may include, by way of example and not limitation, GNSS data, RADAR data, Inertial Measurement Unit (IMU) data, LIDAR data, wheel odometry data, speed sensors, vibration sensors, image data, etc. that may be generated using one or more corresponding sensors, such as described in the present disclosure, for example with respect to the autonomous vehicle 300 of FIGS. 3A-3D.

In some embodiments, the state observation module 104 may be configured to use this example sensor data 114 to determine a motion state of the vehicle. For example, the state observation module 104 may be configured to determine an observed position of the vehicle by performing localization based on one or more of the GNSS data, the RADAR data, the image data, the LIDAR data, the speed data, the IMU data, etc. Additionally or alternatively, the state observation module 104 may be configured to determine an observed velocity of the vehicle (e.g., based on the wheel odometry data), an observed acceleration (e.g., based on the IMU data), and/or an observed yaw rate (e.g., based on the IMU data). In these or other embodiments, the observed position, velocity, acceleration, and/or yaw rate may be indicated by the observed state data 116.

In these or other embodiments, the observed state data 116 may include respective states of the system 102 at various points in time. For example, the state observation module 104 may be configured to determine a first observed state of the system 102 that corresponds to a first point in time based on sensor data 114 that also corresponds to the first point in time (e.g., based on sensor data 114 having a time stamp that corresponds to the first point in time). Additionally or alternatively, the state observation module 104 may be configured to determine a second observed state of the system 102 that corresponds to a second point in time based on sensor data 114 that also corresponds to the second point in time (e.g., based on sensor data 114 having a time stamp that corresponds to the second point in time).

In some embodiments, the disturbance module 106 may also be configured to generate estimated state data. In some embodiments, the disturbance module 106 may be configured to generate the estimated state data based on the intrinsic measurement data 112. In some embodiments, the intrinsic measurement data 112 may include data that may indicate one or more system states at a given point in time. For example, in some embodiments, the intrinsic measurement data 112 may include data obtained using one or more sensors that are configured to observe one or more characteristics that may indirectly indicate the system states. For instance, the intrinsic measurement data 112 may be provided as inputs to a state model of the system 102 in which the state model may estimate one or more characteristics of the system states based on the intrinsic measurement data 112. In some embodiments, the state model may be included in the disturbance module 106.

In these and other embodiments, the disturbance module 106 may be configured to determine one or more estimated states of the system 102 using the intrinsic measurement data 112. By way of example, continuing with the example of the system 102 including a vehicle, the intrinsic measurement data 112 may include one or more steering angles (e.g., a front steering angle and/or a rear steering angle which may be obtained using one or more corresponding sensors), one or more axle curvatures (e.g., a front axle curvature and/or a rear axle curvature which may be obtained using one or more corresponding sensors), brake pedal force (e.g., obtained using one or more corresponding sensors), gas pedal force (e.g., obtained using one or more corresponding sensors), etc. In these or other embodiments, such data may be provided as input to a vehicle dynamics model which may estimate—e.g., based on the input intrinsic measurement data 112—one or more characteristics of a motion state of the vehicle, which may include acceleration, speed, and/or yaw rate. Additionally or alternatively, the vehicle dynamics model may be used to estimate, as part of the motion state, a position based on past position data (e.g., included in past estimated and/or observed state data) and based on one or more of the estimated characteristics determined based on the intrinsic measurement data 112. For instance, yaw rates, speed, and/or acceleration over a period of time may indicate a plan of travel from a past position, which may accordingly indicate a current position. In the present disclosure, system states that may be indicated and/or determined based on sensors and corresponding sensor data that are configured to indirectly measure the characteristics of the system states, such as described with respect to the intrinsic measurement data 112, may be referred to as "estimated states," where the estimated states may include one or more predicted states in some instances.

In some embodiments, the disturbance module 106 may be configured to determine one or more disturbances that may have been encountered by the system 102 at one or more points in time based on the estimated states and the observed states. In some embodiments, the disturbance module 106 may be configured to determine the one or more disturbances by comparing observed states of the system 102 (e.g., as indicated by the observed state data 116) and estimated states of the system 102 (e.g., as determined and/or indicated by the intrinsic measurement data 112).

For instance, the observed state data 116 may include an observed speed corresponding to time $t_{n+1}$ and the estimated state data may include an estimated speed corresponding to time $t_{n+1}$ that may be different from the observed speed at time $t_{n+1}$. The difference in the two speeds may be used to determine that a disturbance occurred. In these and other embodiments, differences between the observed and expected states of the system 102 may be used to generate disturbance data 120 corresponding to the one or more disturbances.

The disturbance data 120 may include one or more data points indicating a difference between one or more characteristics of an estimated state and an observed state at a particular point in time. For example, at time $t_n$, the system 102 may have an estimated acceleration of X and an observed acceleration of Y where X and Y are different values, vectors, or distributions of data. Continuing the example, the disturbance data 120 may include a difference between the observed acceleration and estimated acceleration at time $t_n$ (e.g., X–Y). In these and other embodiments, the disturbance data may include discrete data points, vectors, matrices, distributions of data, or any other data illustration of a difference between an estimated state and an observed state at a particular point in time. Additionally, while the example illustrates a difference between estimated and observed states by subtracting an observed acceleration from an estimated acceleration, one or more other mathematical operations may be performed in addition to or instead of subtraction that may illustrate a difference between the estimated and observed states at a particular point in time (e.g., identifying differing terms in vectors, cross product vector calculation, and other mathematical formulas designed to compare and/or contrast scalars, vectors, matrices, and other distributions of data).

In some embodiments, disturbance data 120 may include a collection of data that may describe respective differences between characteristics of an observed state and an estimated state at a particular time step. For example, disturbance data 120 may include data describing one or more difference between an estimated position, velocity, acceleration, and/or yaw rate and an observed position, velocity, acceleration, and/or yaw rate of the system 102 at time $t_n$.

In some embodiments, disturbance data 120 corresponding to a particular point in time may be generated by aggregating individual disturbance determinations made with respect to the particular point in time and one or more individual points in time that were previous to the particular point in time in a recursive manner. Data corresponding to a particular point in time may be generated at a same point in time and/or different points in time. Where data is generated at points of time different than the particular point in time, the data may be used directly as corresponding to the point in time (e.g., without transformation/compensation) and/or may be transformed or compensated to correspond to the particular point in time. For example, ego-motion information may be used to transform or compensate the data from a time step that the data was generated to the particular time step used as the time step in the calculations. For example, the disturbance data 120 may include data corresponding to time steps $t_n$ and $t_{n-1}$ based on estimated and observed state data at time steps $t_n$ and $t_{n-1}$. In these or other embodiments, the disturbance data 120 corresponding to time steps $t_n$ and $t_{n-1}$ may be aggregated. For example, the disturbance data 120 may include an aggregation of the disturbance data 120 corresponding to time steps $t_n$ and $t_{n-1}$. Further continuing the example, the disturbance module 106 may use the disturbance data 120 at time steps $t_n$ and $t_{n-1}$ in determining an estimated state prior to comparing the estimated and observed states. In some embodiments, determining the estimated state and/or determining the differences between the estimated and observed states may be determined in a recursive manner using one or more state filters, observers, and/or algorithms (e.g., a Kalman filter, Luenberger observer, and/or other predictive algorithms).

In some embodiments, the differences between estimated and observed states at various time steps may be expressed by the disturbance data 120 in the form of an augmented state of the system 102 (and corresponding augmented state data) at a particular point in time. The augmented state of the system 102 may indicate the effect of a disturbance on the state of the system 102 relative to an estimated and/or an observed state. In some embodiments, the augmented state of the system 102 may describe a state of the system 102 in relation to an estimated state and/or an observed state of the system 102 at a particular point in time. For instance, continuing in the context of system 102 as a vehicle, an observed state at time $t_n$ may include a first vector that may describe an observed velocity that may be different from a second vector that may describe an estimated velocity of the vehicle at time $t_n$. Continuing the example, the disturbance module 106 may generate disturbance data 120 that may illustrate the difference between the estimated and observed velocities at time $t_n$ by subtracting the first vector from the second vector. Further continuing the example, the resulting vector may illustrate an effect of a potential disturbance on a velocity of the vehicle relative to the estimated velocity and observed velocity of the vehicle. Further, the resulting vector may be included in an augmented state of the system 102.

In some embodiments, the disturbance data 120 may be generated by the disturbance module 106 and may be used by the control module 110 to determine one or more control commands 124 to compensate for the one or more disturbances described by the disturbance data 120.

In some embodiments, the one or more control commands 124 may include one or more instructions (e.g., that may be output as control signals) that may indicate and/or cause a change in one or more of the characteristics associated with a state of the system 102. For example, in the context of the system 102 as a vehicle, the one or more control commands 124 may include increasing or decreasing the vehicle speed (e.g., via one or more control signals that control the brake and/or the gas pedal), turning the vehicle in a given direction (e.g., via one or more control signals that control the steering), adjusting a center line for the vehicle to follow (e.g., via one or more control signals that control the steering), or any other change or any combination of the aforementioned changes. In some embodiments, the one or more control commands 124 may include one or more instructions that may indicate no change in the characteristics describing the state of the system 102. For example, the control command(s) 124 may instruct that the system 102 to continue its current state (e.g., maintain speed, acceleration, yaw rate, temperature, humidity levels, etc.).

In some embodiments, the control module 110 may generate one or more control commands 124 based on plan data 118. The plan data 118 may include information related to one or more operations that may relate to execution of a plan to complete a given task. For example, in the context of the system 102 as a vehicle, the vehicle may have a plan that may include travelling from point A to point B. In these or other embodiments, the plan data 118 may include information related to velocity, position, acceleration, steering, etc. of the vehicle that may help direct the vehicle to travel from point A to point B.

Additionally or alternatively, the plan data 118 may include data that may relate to past states of the system 102 at one or more past time steps. For example, the plan data 118 may include past state data in some embodiments, which may indicate how well the plan is being followed. For instance, in the context of system 102 as a vehicle, the vehicle may be travelling from point A to point B at a time step $t_{n+1}$. Continuing the example, the plan data 118 may include a first velocity at time step $t_n$ and a second velocity $t_{n-1}$. Further continuing the example, based at least on the first and second velocities, the control module 110 may generate a control command 124 that may change a vehicle state at $t_{n+2}$. In some embodiments, the plan data 118 may be generated by any suitable software and/or hardware component. For example, in the context of the system 102 including a vehicle configured to perform autonomous driving operations, the plan data 118 may be generated by a planning module 108 that is configured to determine a plan related to travel of the vehicle.

In some embodiments, the control module 110 may be configured to generate one or more control commands based on the observed state data 116 and the disturbance data 120, in addition to the plan data 118. For instance, in the context of system 102 as a vehicle, the control module 110 may receive observed state data 116 that may include an observed velocity at time $t_n$, plan data 118 that may include a planned velocity of the vehicle at one or more future time steps (e.g., $t_{n+1}$, $t_{n+2}$, etc.), and disturbance data 120 that may indicate an effect of a disturbance on the velocity at time $t_n$. Continuing the example, based on the observed velocity, velocity at one or more future time steps, and the effect of a disturbance on the velocity, the control module 110 may be configured to determine one or more of the control commands 124 for time step $t_{n+1}$.

In some embodiments, the control module 110 may be configured to perform operations (e.g., operations comprising a state space formulation) on one or more of the disturbance data 120, the observed state data 116, and the plan data 118 to determine a state space. In these and other embodiments, a "state space" may generally refer to a collection of variables that may affect a state of the system at a particular time step.

By way of example and not limitation, the control module 110 may be configured to determine a state space using the state space formulation at a particular time step. The state space formulation may include one or more operations that may use observed state data 116, plan data 118, and disturbance data 120 at the particular time step. Further, the state space determined based on the observed state data 116, the plan data 118, and the disturbance data 120 may be used to generate one or more control commands 124, the result of which may be to compensate for one or more disturbances that may have been encountered by the system 102.

In these and other embodiments, the operations comprising the state space formulation may include one or more models that may accept one or more terms. For example, the state space formulation may include operations designed to determine a state space based on one or more observed state terms that may be indicated by observed state data 116, one or more plan terms that may be indicated by plan data 118, and one or more disturbance terms that may be indicated by disturbance data 120. In some embodiments, the one or more observed state terms, plan terms, and/or disturbance terms may be updated at one or more time steps according to the observed state data 116, the plan data 118, and/or the disturbance data 120 generated at the one or more time steps. Additionally or alternatively, the one or more observed state terms, plan terms, and/or disturbance terms used in the state space formulation may be updated at each time step by the corresponding observed state data 116, the plan data 118, and/or the disturbance data 120 at each time step. In these and other embodiments, one or more control commands 124 may be generated at one or more time steps based on the operations comprising the state space formulation.

In some embodiments, the plan data 118, the disturbance data 120, and the observed state data 116 may be received by the control module 110 as one or more matrices as described in the present disclosure at least with respect to FIG. 1B.

FIG. 1B illustrates an example embodiment of an environment 150 relating to generating control command(s) 124 based on disturbance data, in accordance with some embodiments of the present disclosure. The environment 150 may include a control module 110 that may be configured to generate one or more control commands 124 as an output based at least one data received from matrices 126a, 126b, and 126c (together "the matrices 126").

In some embodiments, the environment 150 may be included in the environment 100 as described and illustrated in FIG. 1A. In these and other embodiments, the control module 110 and the one or more control commands 124 may be the same as the control module 110 and the one or more control commands 124 described in FIG. 1A.

In some embodiments, the control module 110 may be configured to receive plan data 118 corresponding to a plan of the system 102, observed state data 116 corresponding to one or more observed system states, and disturbance data 120 corresponding to one or more disturbances detected in the disturbance module 106 in the form of one or more matrices. By way of example, the matrix 126a may include the plan data 118, the matrix 126b may include the observed state data, and the matrix 126c may include the disturbance data 120.

In some embodiments, the control module 110 may be configured to determine one or more control commands 124 by processing the matrices. For example, in some embodiments, the control module 110 may be configured to perform one or more process control operations that may allow the control module 110 to use the matrices as an input to one or more algorithms to determine one or more control commands 124. For instance, by way of example and not limitation, the process control operations may include operations of a model predictive control ("MPC") algorithm, linear-quadratic regulator ("LQR") algorithm, etc.

In some embodiments, the process control operations may allow the control module 110 to use plan data 118, disturbance data 120, and observed state data 116 at one or more time steps to determine a representation of future states at one or more future time steps. For example, the control module 110 may receive the matrices 126 as one or more inputs to the process control operations (e.g., an MPC algorithm). Continuing the example, the process control operations may use the inputs to determine a future state of the system 102 without intervening using control command(s) 124. Further continuing the example, the control module 110 may further determine one or more control commands 124 in light of the plan and the determined state of the system 102.

The inclusion of the disturbance data as an input of the process control operations performed by the control module 110 may be such that the process control operations take the corresponding disturbances into consideration in the determination of the solution that is used to generate one or more of the control commands 124. For example, the disturbance data may be used as an additional input to a state space formulation where the process control operations performed by the control module 110 may take the disturbance data into account at each time step. For example, the control module may be configured to perform operations to determine a state space at a particular time step (e.g., operations included in a state space formulation). Further, the matrices 126 may be used in the state space formulation at one or more time steps. The plan data 118 may be formatted as a first matrix 126a in the state space formulation, the sensor data may be formatted as a second matrix 126b in the state space formulation, and the disturbance data may be formatted as a third matrix 126c in the state space formulation. Continuing the example, as a part of the state space formulation, one or more operations may be performed to generate one or more control commands 124. The operations to generate one or more control commands 124 may include processing the first matrix, the second matrix, and the third matrix. Further, the one or more generated control commands 124, as output by the control module 110, may accordingly compensate for one or more detected disturbances.

Returning to FIG. 1A, in some embodiments, the system 102 may be configured to receive the one or more control commands 124 corresponding to particular time steps and perform operations based on the one or more control commands 124.

For example, continuing in the context of the system 102 as a vehicle, with respect to time $t_{n+1}$ the control module 110 may receive plan data 118 corresponding to a plan for the vehicle at one or more future times (e.g., $t_{n+2}$, $t_{n+3}$, etc.), observed state data 116 corresponding to an observed state of the vehicle corresponding to time $t_{n+1}$, and disturbance data 120 corresponding to time $t_{n+1}$. Continuing the example, the plan data 118 corresponding to the plan of the vehicle may indicate the vehicle may have been moving straight and in the center of a lane. Further, the observed state data 116 corresponding to the observed state of the vehicle may indicate an observed speed, an observed acceleration, an observed yaw rate, etc., and the disturbance data 120 may indicate that the vehicle is driving to the left of the center of the lane and slower than estimated. Continuing the example, the control module 110 may determine that the vehicle has an intended position in the center of the lane and at a faster speed than the vehicle is travelling at time step $t_{n+1}$; to compensate for the disturbance, the control module 110 may determine one or more control commands 124 to increase the speed of the vehicle and turn back to the center of the lane at time step $t_{n+2}$. Further continuing the example, the system 102 may be configured to receive the one or more control commands 124 and respond by increasing its speed and turning back to the center of the lane at time step $t_{n+2}$ thereby compensating for the one or more disturbances.

Figure 2:
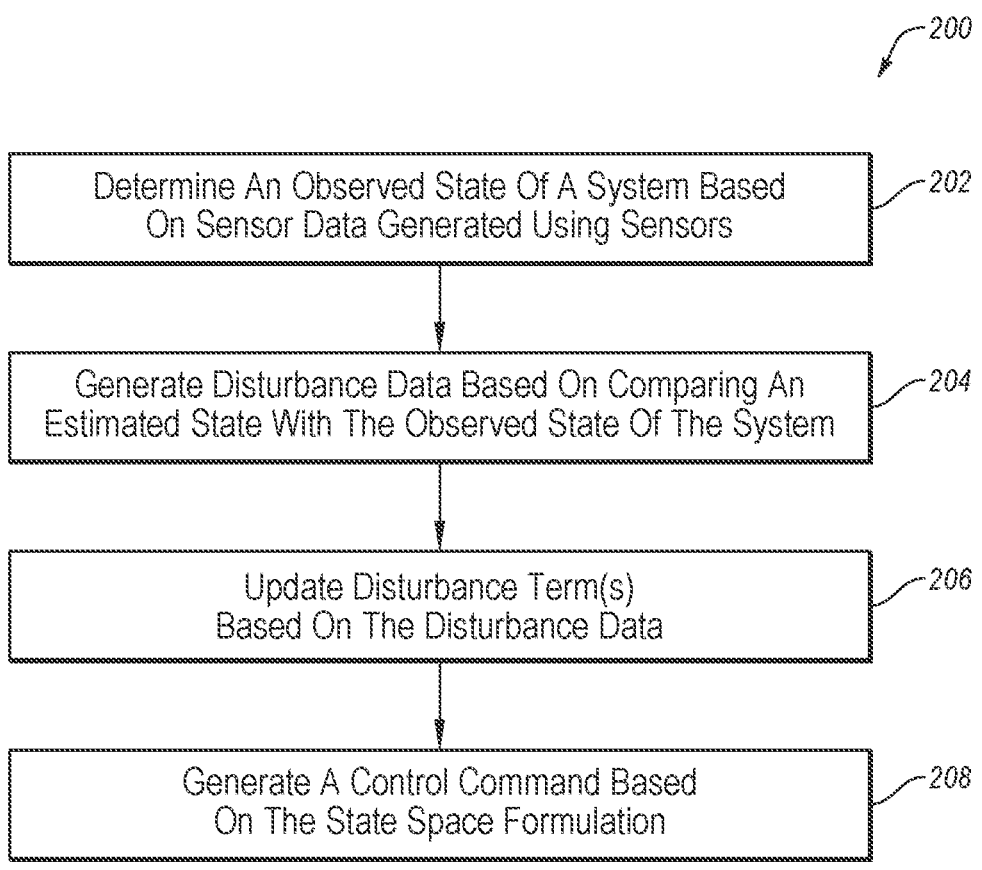
FIG. 2 illustrates a flowchart of an example method of generating one or more control commands, in accordance with some embodiments of the present disclosure.

FIG. 2 illustrates a flowchart of an example method 200 of generating one or more control commands, in accordance with some embodiments of the present disclosure. The method 200 may be performed by any suitable system, apparatus, or device using any combination of hardware, firmware, and/or software. For instance, various operations may be carried out by one or more processors executing instructions stored in memory. The operations of the method 200 may also be embodied as computer-usable instructions stored on computer storage media. Additionally or alternatively, one or more of the operations of the method 200 may be provided by a standalone application, a service or hosted service (standalone or in combination with another hosted service), or a plug-in to another product, to name a few.

For example, one or more of the operations of the method 200 may be performed by any suitable system, apparatus, or device associated with the environment 100 of FIG. 1A and/or the environment 150 of FIG. 1B. In these or other embodiments, one or more operations may be performed by one or more computing devices, such as that described in further detail at least with respect to FIG. 4. In these or other embodiments, one or more operations of the method 200 may be performed by a computing system disposed on an ego-machine, such as a vehicle as described at least with respect to FIGS. 3A-3D.

The method 200 may include one or more blocks 202, 204, 206, and 208. Although illustrated with discrete blocks, the steps and operations associated with one or more of the blocks of the method 200 may be divided into additional blocks, combined into fewer blocks, or eliminated, depending on the particular implementation.

In some embodiments, the method 200 may include, at block 202, determining an observed state of a system. In some embodiments, the observed state of the system may be generated based at least on sensor data generated using one or more sensors of the system as described such as, for example in FIG. 1A in the present disclosure.

At block 204, disturbance data related to a disturbance may be generated. In some embodiments, the disturbance data may be generated based on comparing an estimated state of the system with an observed state of the system, such as disclosed in the present disclosure. For example, in some embodiments, the estimated state and the observed state may be compared at a particular time step. In these and other embodiments, differences between the observed and estimated states of the system may be used to generate disturbance data corresponding to the one or more disturbances. In some embodiments, comparing the estimated and observed states may include determining the differences between the estimated and observed states in a recursive manner using one or more state filters, observers and/or algorithms (e.g., a Kalman filter, Luenberger observer, and/or other predictive algorithms).

In some embodiments, the estimated state may be determined based on intrinsic measurement data where the intrinsic measurement data may indirectly indicate one or more characteristics of a system and/or a system model. In some embodiments, the observed state of the system may be determined based on observed measurement data that may directly indicate one or more characteristics of the system.

At block 206, one or more disturbance terms may be updated. In these or other embodiments, the updated disturbance terms may be used in an updated state space formulation. In some embodiments, the one or more disturbance terms of the state space formulation may be updated based at least on the disturbance data. In some embodiments, the state space formulation may include one or more models that may accept one or more inputs to determine state space(s). The one or more inputs may include one or more terms—e.g., observed state term(s), plan term(s), and/or disturbance term(s). In these and other embodiments, as a part of the state space formulation, the observed term(s) may use observed state data, the plan term(s) may use plan data, and the disturbance term(s) may use disturbance data. In some embodiments, the observed state term(s), the plan term(s), and/or the disturbance term(s) may be updated at one or more time steps by, for example, observed state data, plan data, and/or disturbance data at one or more respective time steps.

At block 208, a control command may be generated. In these and other embodiments, the control command may be generated based at least on the state space formulation, where the control command may direct one or more operations of the system (e.g., that may be output as control signals) that may indicate and/or cause a change in one or more of the characteristics associated with a state of the system. In some embodiments, the control command may direct one or more operations of the system according to plan data that may be indicative of a plan for completing one or more tasks of the system. In some embodiments, the state space formulation may include one or more operations that may use disturbance data, observed state data, and plan data to determine one or more state spaces of the system that may further be used to generate one or more control commands, such as described in the present disclosure with respect to FIGS. 1A and 1B.

In some embodiments, the one or more control commands may be generated based on data included in one or more matrices. For example, the plan data may be formatted as a first matrix in the state space formulation, the sensor data may be formatted as a second matrix in the state space formulation, and the disturbance data may be formatted as a third matrix in the state space formulation. Continuing the example, the one or more control commands may be generated based at least on processing the first matrix, the second matrix, and the third matrix that may be formatted as inputs to the state space formulation. In some embodiments, the processing of the one or more matrices may be performed using one or more control algorithms. For example, processing the first matrix including the plan data, the second matrix including the sensor data, and the third matrix including the disturbance data may be performed using at least one of a model predictive control ("MPC") algorithm or a linear-quadratic regulator ("LQR") algorithm.

Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 3A:
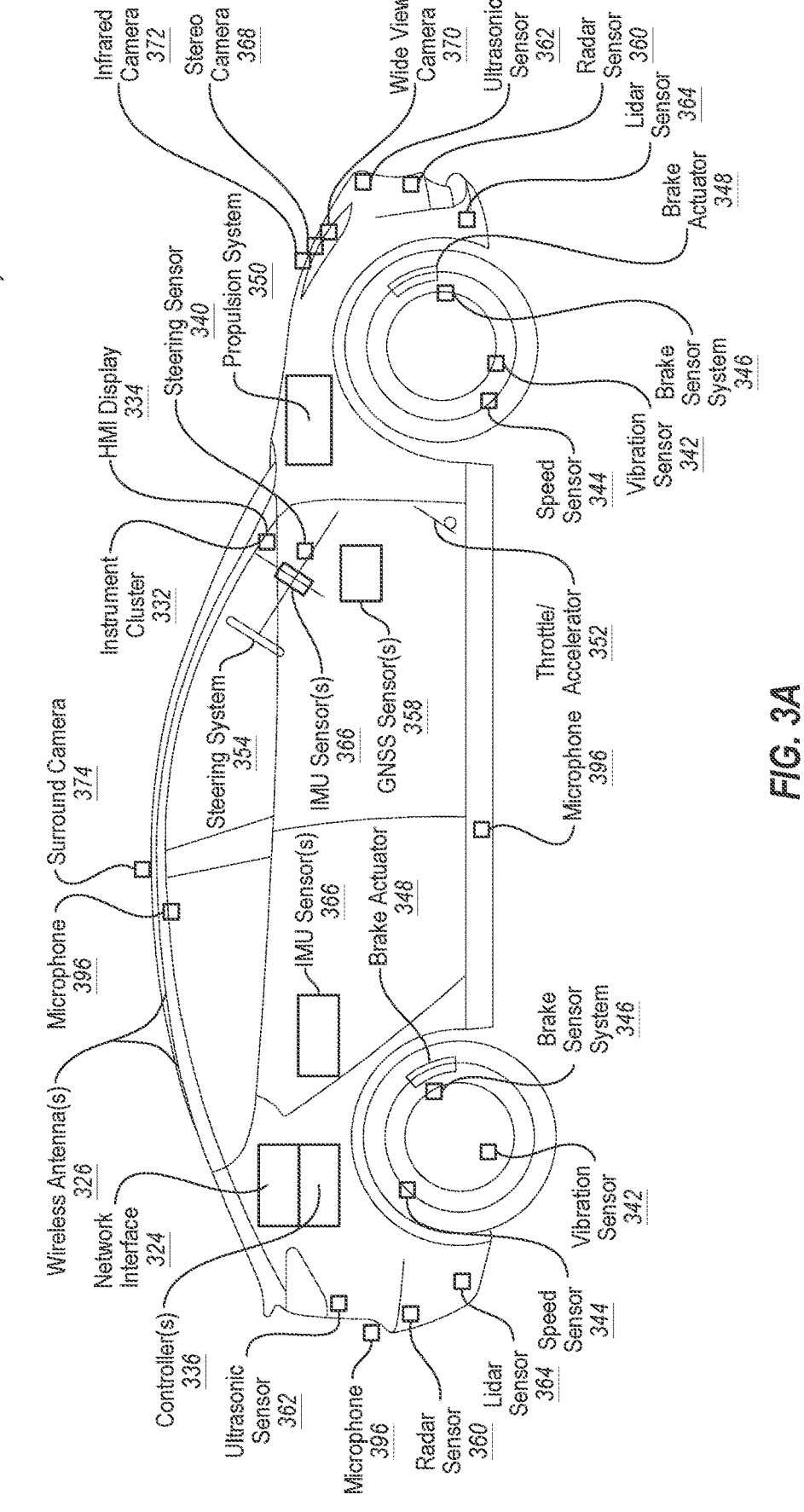
FIG. 3A is an illustration of an example autonomous vehicle, in accordance with some embodiments of the present disclosure.

FIG. 3A is an illustration of an example autonomous vehicle 300, in accordance with some embodiments of the present disclosure. The autonomous vehicle 300 (alternatively referred to herein as the "vehicle 300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 300 may be capable of functionality in accordance with one or more of Level 3-Level 5 of the autonomous driving levels. The vehicle 300 may be capable of functionality in accordance with one or more of Level 1-Level 5 of the autonomous driving levels. For example, the vehicle 300 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 300 or other machine, such as being fully autonomous, being highly autonomous, being conditionally autonomous, being partially autonomous, providing assistive autonomy, being semi-autonomous, being primarily autonomous, or other designation.

The vehicle 300 may include components such as a chassis, a vehicle body, wheels (e.g., 2, 4, 6, 8, 18, etc.), tires, axles, and other components of a vehicle. The vehicle 300 may include a propulsion system 350, such as an internal combustion engine, hybrid electric power plant, an all-electric engine, and/or another propulsion system type. The propulsion system 350 may be connected to a drive train of the vehicle 300, which may include a transmission, to enable the propulsion of the vehicle 300. The propulsion system 350 may be controlled in response to receiving signals from the throttle/accelerator 352.

A steering system 354, which may include a steering wheel, may be used to steer the vehicle 300 (e.g., along a desired path or route) when the propulsion system 350 is operating (e.g., when the vehicle is in motion). The steering system 354 may receive signals from a steering actuator 356. The steering wheel may be optional for full automation (Level 5) functionality.

The brake sensor system 346 may be used to operate the vehicle brakes in response to receiving signals from the brake actuators 348 and/or brake sensors.

Controller(s) 336, which may include one or more system on chips (SoCs) 304 (FIG. 3C) and/or GPU(s), may provide signals (e.g., representative of commands) to one or more components and/or systems of the vehicle 300. For example, the controller(s) may send signals to operate the vehicle brakes via one or more brake actuators 348, to operate the steering system 354 via one or more steering actuators 356, to operate the propulsion system 350 via one or more throttle/accelerators 352. The controller(s) 336 may include one or more onboard (e.g., integrated) computing devices (e.g., supercomputers) that process sensor signals, and output operation commands (e.g., signals representing commands) to enable autonomous driving and/or to assist a human driver in driving the vehicle 300. The controller(s) 336 may include a first controller 336 for autonomous driving functions, a second controller 336 for functional safety functions, a third controller 336 for artificial intelligence functionality (e.g., computer vision), a fourth controller 336 for infotainment functionality, a fifth controller 336 for redundancy in emergency conditions, and/or other controllers. In some examples, a single controller 336 may handle two or more of the above functionalities, two or more controllers 336 may handle a single functionality, and/or any combination thereof.

The controller(s) 336 may provide the signals for controlling one or more components and/or systems of the vehicle 300 in response to sensor data received from one or more sensors (e.g., sensor inputs). The sensor data may be received from, for example and without limitation, global navigation satellite systems sensor(s) 358 (e.g., Global Positioning System sensor(s)), RADAR sensor(s) 360, ultrasonic sensor(s) 362, LIDAR sensor(s) 364, inertial measurement unit (IMU) sensor(s) 366 (e.g., accelerometer(s), gyroscope(s), magnetic compass(es), magnetometer(s), etc.), microphone(s) 396, stereo camera(s) 368, wide-view camera(s) 370 (e.g., fisheye cameras), infrared camera(s) 372, surround camera(s) 374 (e.g., 360 degree cameras), long-range and/or mid-range camera(s) 398, speed sensor(s) 344 (e.g., for measuring the speed of the vehicle 300), vibration sensor(s) 342, steering sensor(s) 340, brake sensor(s) (e.g., as part of the brake sensor system 346), and/or other sensor types.

One or more of the controller(s) 336 may receive inputs (e.g., represented by input data) from an instrument cluster 332 of the vehicle 300 and provide outputs (e.g., represented by output data, display data, etc.) via a human-machine interface (HMI) display 334, an audible annunciator, a loudspeaker, and/or via other components of the vehicle 300.

The outputs may include information such as vehicle velocity, speed, time, map data (e.g., the HD map 322 of FIG. 3C), location data (e.g., the vehicle's 300 location, such as on a map), direction, location of other vehicles (e.g., an occupancy grid), information about objects and status of objects as perceived by the controller(s) 336, etc. For example, the HMI display 334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 300 further includes a network interface 324 which may use one or more wireless antenna(s) 315 and/or modem(s) to communicate over one or more networks. For example, the network interface 324 may be capable of communication over LTE, WCDMA, UMTS, GSM, CDMA2000, etc. The wireless antenna(s) 315 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 3B:
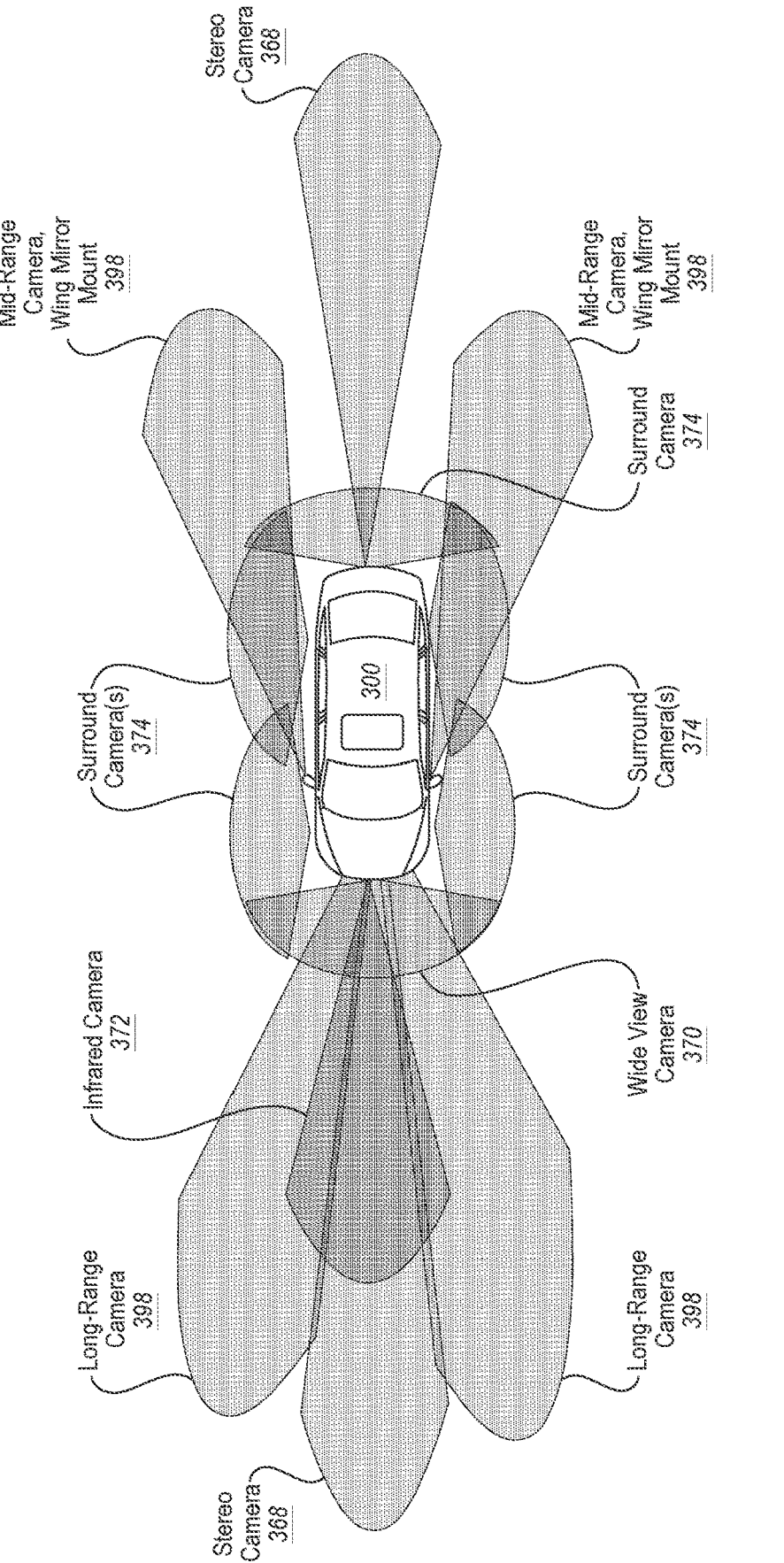
FIG. 3B is an example of camera locations and fields of view for the example autonomous vehicle of FIG. 3A, in accordance with some embodiments of the present disclosure.

FIG. 3B is an example of camera locations and fields of view for the example autonomous vehicle 300 of FIG. 3A, in accordance with some embodiments of the present disclosure. The cameras and respective fields of view are one example embodiment and are not intended to be limiting. For example, additional and/or alternative cameras may be included and/or the cameras may be located at different locations on the vehicle 300.

The camera types for the cameras may include, but are not limited to, digital cameras that may be adapted for use with the components and/or systems of the vehicle 300. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 300 (e.g., front-facing cameras) may be used for surround view, to help identify forward facing paths and obstacles, as well aid in, with the help of one or more controllers 336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 370 that may be used to perceive objects coming into view from the periphery (e.g., pedestrians, crossing traffic or bicycles). Although only one wide-view camera is illustrated in FIG. 3B, there may any number of wide-view cameras 370 on the vehicle 300. In addition, long-range camera(s) 398 (e.g., a long-view stereo camera pair) may be used for depth-based object detection, especially for objects for which a neural network has not yet been trained. The long-range camera(s) 398 may also be used for object detection and classification, as well as basic object tracking.

One or more stereo cameras 368 may also be included in a front-facing configuration. The stereo camera(s) 368 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 368 may be used in addition to, or alternatively from, those described herein.

Cameras with a field of view that include portions of the environment to the side of the vehicle 300 (e.g., side-view cameras) may be used for surround view, providing information used to create and update the occupancy grid, as well as to generate side impact collision warnings. For example, surround camera(s) 374 (e.g., four surround cameras 374 as illustrated in FIG. 3B) may be positioned to on the vehicle 300. The surround camera(s) 374 may include wide-view camera(s) 370, fisheye camera(s), 360 degree camera(s), and/or the like. Four example, four fisheye cameras may be positioned on the vehicle's front, rear, and sides. In an alternative arrangement, the vehicle may use three surround camera(s) 374 (e.g., left, right, and rear), and may leverage one or more other camera(s) (e.g., a forward-facing camera) as a fourth surround view camera.

Cameras with a field of view that include portions of the environment to the rear of the vehicle 300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 398, stereo camera(s) 368), infrared camera(s) 372, etc.), as described herein.

Figure 3C:
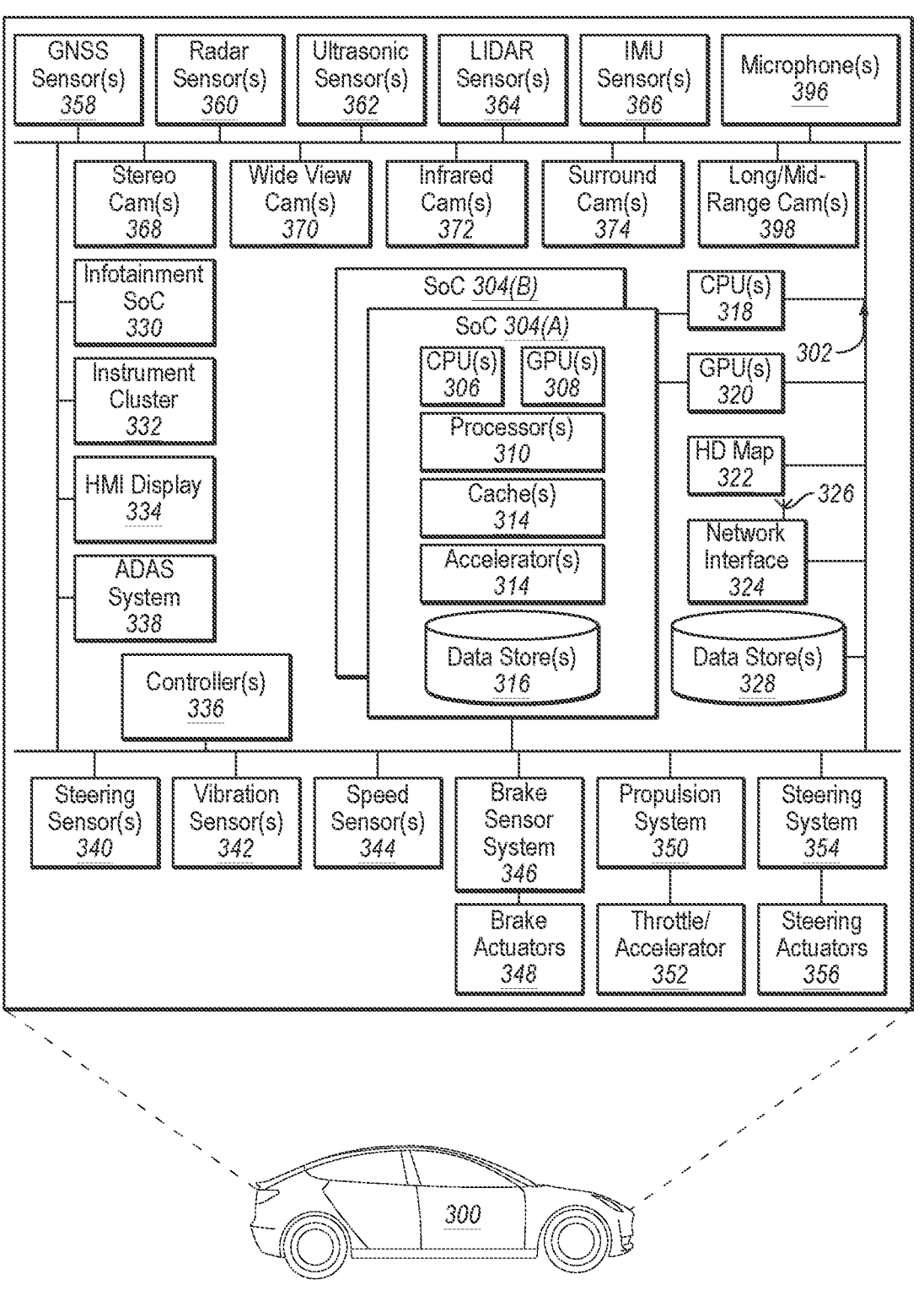
FIG. 3C is a block diagram of an example system architecture for the example autonomous vehicle of FIG. 3A, in accordance with some embodiments of the present disclosure.

FIG. 3C is a block diagram of an example system architecture for the example autonomous vehicle 300 of FIG. 3A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 300 in FIG. 3C are illustrated as being connected via bus 302. The bus 302 may include a Controller Area Network (CAN) data interface (alternatively referred to herein as a "CAN bus"). A CAN may be a network inside the vehicle 300 used to aid in control of various features and functionality of the vehicle 300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 302 is described herein as being a CAN bus, this is not intended to be limiting. For example, in addition to, or alternatively from, the CAN bus, FlexRay and/or Ethernet may be used. Additionally, although a single line is used to represent the bus 302, this is not intended to be limiting. For example, there may be any number of busses 302, which may include one or more CAN busses, one or more FlexRay busses, one or more Ethernet busses, and/or one or more other types of busses using a different protocol. In some examples, two or more busses 302 may be used to perform different functions, and/or may be used for redundancy. For example, a first bus 302 may be used for collision avoidance functionality and a second bus 302 may be used for actuation control. In any example, each bus 302 may communicate with any of the components of the vehicle 300, and two or more busses 302 may communicate with the same components. In some examples, each SoC 304, each controller 336, and/or each computer within the vehicle may have access to the same input data (e.g., inputs from sensors of the vehicle 300), and may be connected to a common bus, such the CAN bus.

The vehicle 300 may include one or more controller(s) 336, such as those described herein with respect to FIG. 3A. The controller(s) 336 may be used for a variety of functions. The controller(s) 336 may be coupled to any of the various other components and systems of the vehicle 300, and may be used for control of the vehicle 300, artificial intelligence of the vehicle 300, infotainment for the vehicle 300, and/or the like.

The vehicle 300 may include a system(s) on a chip (SoC) 304. The SoC 304 may include CPU(s) 306, GPU(s) 308, processor(s) 310, cache(s) 312, accelerator(s) 314, data store(s) 316, and/or other components and features not illustrated. The SoC(s) 304 may be used to control the vehicle 300 in a variety of platforms and systems. For example, the SoC(s) 304 may be combined in a system (e.g., the system of the vehicle 300) with an HD map 322 which may obtain map refreshes and/or updates via a network interface 324 from one or more servers (e.g., server(s) 378 of FIG. 3D).

The CPU(s) 306 may include a CPU cluster or CPU complex (alternatively referred to herein as a "CCPLEX"). The CPU(s) 306 may include multiple cores and/or L2 caches. For example, in some embodiments, the CPU(s) 306 may include eight cores in a coherent multi-processor configuration. In some embodiments, the CPU(s) 306 may include four dual-core clusters where each cluster has a dedicated L2 cache (e.g., a 2 MB L2 cache). The CPU(s) 306 (e.g., the CCPLEX) may be configured to support simultaneous cluster operation enabling any combination of the clusters of the CPU(s) 306 to be active at any given time.

The CPU(s) 306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 308 may include an integrated GPU (alternatively referred to herein as an "iGPU"). The GPU(s) 308 may be programmable and may be efficient for parallel workloads. The GPU(s) 308, in some examples, may use an enhanced tensor instruction set. The GPU(s) 308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 308 may include at least eight streaming microprocessors. The GPU(s) 308 may use compute application programming interface(s) (API(s)). In addition, the GPU(s) 308 may use one or more parallel computing platforms and/or programming models (e.g., NVIDIA's CUDA).

The GPU(s) 308 may be power-optimized for best performance in automotive and embedded use cases. For example, the GPU(s) 308 may be fabricated on a Fin field-effect transistor (FinFET). However, this is not intended to be limiting and the GPU(s) 308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16

INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 308 to access the CPU(s) 306 page tables directly. In such examples, when the GPU(s) 308 memory management unit (MMU) experiences a miss, an address translation request may be transmitted to the CPU(s) 306. In response, the CPU(s) 306 may look in its page tables for the virtual-to-physical mapping for the address and transmits the translation back to the GPU(s) 308. As such, unified memory technology may allow a single unified virtual address space for memory of both the CPU(s) 306 and the GPU(s) 308, thereby simplifying the GPU(s) 308 programming and porting of applications to the GPU(s) 308.

In addition, the GPU(s) 308 may include an access counter that may keep track of the frequency of access of the GPU(s) 308 to memory of other processors. The access counter may help ensure that memory pages are moved to the physical memory of the processor that is accessing the pages most frequently.

The SoC(s) 304 may include any number of cache(s) 312, including those described herein. For example, the cache(s) 312 may include an L3 cache that is available to both the CPU(s) 306 and the GPU(s) 308 (e.g., that is connected both the CPU(s) 306 and the GPU(s) 308). The cache(s) 312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 304 may include an arithmetic logic unit(s) (ALU(s)) which may be leveraged in performing processing with respect to any of the variety of tasks or operations of the vehicle 300—such as processing DNNs. In addition, the SoC(s) 304 may include a floating point unit(s) (FPU(s))— or other math coprocessor or numeric coprocessor types— for performing mathematical operations within the system. For example, the SoC(s) 304 may include one or more FPUs integrated as execution units within a CPU(s) 306 and/or GPU(s) 308.

The SoC(s) 304 may include one or more accelerators 314 (e.g., hardware accelerators, software accelerators, or a combination thereof). For example, the SoC(s) 304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 308 and to off-load some of the tasks of the GPU(s) 308 (e.g., to free up more cycles of the GPU(s) 308 for performing other tasks). As an example, the accelerator(s) 314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 308, and by using an inference accelerator, for example, a designer may target either the DLA(s) or the GPU(s) 308 for any function. For example, the designer may focus processing of CNNs and floating point operations on the DLA(s) and leave other functions to the GPU(s) 308 and/or other accelerator(s) 314.

The accelerator(s) 314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced sy computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 314 (e.g., the hardware acceleration cluster) may include a computer vision network on-chip and SRAM, for providing a high-bandwidth, low latency SRAM for the accelerator(s) 314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 314 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 366 output that correlates with the vehicle 300 orientation, distance, 3D location estimates of the object obtained from the neural network and/or other sensors (e.g., LIDAR sensor(s) 364 or RADAR sensor(s) 360), among others.

The SoC(s) 304 may include data store(s) 316 (e.g., memory). The data store(s) 316 may be on-chip memory of the SoC(s) 304, which may store neural networks to be executed on the GPU and/or the DLA. In some examples, the data store(s) 316 may be large enough in capacity to store multiple instances of neural networks for redundancy and safety. The data store(s) 312 may comprise L2 or L3 cache(s) 312. Reference to the data store(s) 316 may include reference to the memory associated with the PVA, DLA, and/or other accelerator(s) 314, as described herein.

The SoC(s) 304 may include one or more processor(s) 310 (e.g., embedded processors). The processor(s) 310 may include a boot and power management processor that may be a dedicated processor and subsystem to handle boot power and management functions and related security enforcement. The boot and power management processor may be a part of the SoC(s) 304 boot sequence and may provide runtime power management services. The boot power and management processor may provide clock and voltage programming, assistance in system low power state transitions, management of SoC(s) 304 thermals and temperature sensors, and/or management of the SoC(s) 304 power states. Each temperature sensor may be implemented as a ring-oscillator whose output frequency is proportional to temperature, and the SoC(s) 304 may use the ring-oscillators to detect temperatures of the CPU(s) 306, GPU(s) 308, and/or accelerator(s) 314. If temperatures are determined to exceed a threshold, the boot and power management processor may enter a temperature fault routine and put the SoC(s) 304 into a lower power state and/or put the vehicle 300 into a chauffeur to safe stop mode (e.g., bring the vehicle 300 to a safe stop).

The processor(s) 310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 310 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 310 may further include a real-time camera engine that may include a dedicated processor subsystem for handling real-time camera management.

The processor(s) 310 may further include a high-dynamic range signal processor that may include an image signal processor that is a hardware engine that is part of the camera processing pipeline.

The processor(s) 310 may include a video image compositor that may be a processing block (e.g., implemented on a microprocessor) that implements video post-processing functions needed by a video playback application to produce the final image for the player window. The video image compositor may perform lens distortion correction on wide-view camera(s) 370, surround camera(s) 374, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 308 is not required to continuously render new surfaces. Even when the GPU(s) 308 is powered on and active doing 3D rendering, the video image compositor may be used to offload the GPU(s) 308 to improve performance and responsiveness.

The SoC(s) 304 may further include a mobile industry processor interface (MIPI) camera serial interface for receiving video and input from cameras, a high-speed interface, and/or a video input block that may be used for camera and related pixel input functions. The SoC(s) 304 may further include an input/output controller(s) that may be controlled by software and may be used for receiving I/O signals that are uncommitted to a specific role.

The SoC(s) 304 may further include a broad range of peripheral interfaces to enable communication with peripherals, audio codecs, power management, and/or other devices. The SoC(s) 304 may be used to process data from cameras (e.g., connected over Gigabit Multimedia Serial Link and Ethernet), sensors (e.g., LIDAR sensor(s) 364, RADAR sensor(s) 360, etc. that may be connected over Ethernet), data from bus 302 (e.g., speed of vehicle 300, steering wheel position, etc.), data from GNSS sensor(s) 358 (e.g., connected over Ethernet or CAN bus). The SoC(s) 304 may further include dedicated high-performance mass storage controllers that may include their own DMA engines, and that may be used to free the CPU(s) 306 from routine data management tasks.

The SoC(s) 304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 304 may be faster, more reliable, and even more energy-efficient and space-efficient than conventional systems. For example, the accelerator(s) 314, when combined with the CPU(s) 306, the GPU(s) 308, and the data store(s) 316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 320) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 308.

In some examples, a CNN for facial recognition and vehicle owner identification may use data from camera sensors to identify the presence of an authorized driver and/or owner of the vehicle 300. The always on sensor processing engine may be used to unlock the vehicle when the owner approaches the driver door and turn on the lights, and, in security mode, to disable the vehicle when the owner leaves the vehicle. In this way, the SoC(s) 304 provide for security against theft and/or carjacking.

In another example, a CNN for emergency vehicle detection and identification may use data from microphones 396 to detect and identify emergency vehicle sirens. In contrast to conventional systems, that use general classifiers to detect sirens and manually extract features, the SoC(s) 304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 362, until the emergency vehicle(s) passes.

The vehicle may include a CPU(s) 318 (e.g., discrete CPU(s), or dCPU(s)), that may be coupled to the SoC(s) 304 via a high-speed interconnect (e.g., PCIe). The CPU(s) 318 may include an X86 processor, for example. The CPU(s) 318 may be used to perform any of a variety of functions, including arbitrating potentially inconsistent results between ADAS sensors and the SoC(s) 304, and/or monitoring the status and health of the controller(s) 336 and/or infotainment SoC 330, for example.

The vehicle 300 may include a GPU(s) 320 (e.g., discrete GPU(s), or dGPU(s)), that may be coupled to the SoC(s) 304 via a high-speed interconnect (e.g., NVIDIA's NVLINK). The GPU(s) 320 may provide additional artificial intelligence functionality, such as by executing redundant and/or different neural networks, and may be used to train and/or update neural networks based on input (e.g., sensor data) from sensors of the vehicle 300.

The vehicle 300 may further include the network interface 324 which may include one or more wireless antennas 315 (e.g., one or more wireless antennas for different communication protocols, such as a cellular antenna, a Bluetooth antenna, etc.). The network interface 324 may be used to enable wireless connectivity over the Internet with the cloud (e.g., with the server(s) 378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 300 information about vehicles in proximity to the vehicle 300 (e.g., vehicles in front of, on the side of, and/or behind the vehicle 300). This functionality may be part of a cooperative adaptive cruise control functionality of the vehicle 300.

The network interface 324 may include a SoC that provides modulation and demodulation functionality and enables the controller(s) 336 to communicate over wireless networks. The network interface 324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 300 may further include data store(s) 328 which may include off-chip (e.g., off the SoC(s) 304) storage. The data store(s) 328 may include one or more storage elements including RAM, SRAM, DRAM, VRAM, Flash, hard disks, and/or other components and/or devices that may store at least one bit of data.

The vehicle 300 may further include GNSS sensor(s) 358. The GNSS sensor(s) 358 (e.g., GPS, assisted GPS sensors, differential GPS (DGPS) sensors, etc.), to assist in mapping, perception, occupancy grid generation, and/or path planning functions. Any number of GNSS sensor(s) 358 may be used, including, for example and without limitation, a GPS using a USB connector with an Ethernet to Serial (RS-232) bridge.

The vehicle 300 may further include RADAR sensor(s) 360. The RADAR sensor(s) 360 may be used by the vehicle 300 for long-range vehicle detection, even in darkness and/or severe weather conditions. RADAR functional safety levels may be ASIL B. The RADAR sensor(s) 360 may use the CAN and/or the bus 302 (e.g., to transmit data generated by the RADAR sensor(s) 360) for control and to access object tracking data, with access to Ethernet to access raw data in some examples. A wide variety of RADAR sensor types may be used. For example, and without limitation, the RADAR sensor(s) 360 may be suitable for front, rear, and side RADAR use. In some example, Pulse Doppler RADAR sensor(s) are used.

The RADAR sensor(s) 360 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 300 surroundings at higher speeds with minimal interference from traffic in adjacent lanes. The other two antennae may expand the field of view, making it possible to quickly detect vehicles entering or leaving the vehicle's 300 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 300 may further include ultrasonic sensor(s) 362. The ultrasonic sensor(s) 362, which may be positioned at the front, back, and/or the sides of the vehicle 300, may be used for park assist and/or to create and update an occupancy grid. A wide variety of ultrasonic sensor(s) 362 may be used, and different ultrasonic sensor(s) 362 may be used for different ranges of detection (e.g., 2.5m, 4m). The ultrasonic sensor(s) 362 may operate at functional safety levels of ASIL B.

The vehicle 300 may include LIDAR sensor(s) 364. The LIDAR sensor(s) 364 may be used for object and pedestrian detection, emergency braking, collision avoidance, and/or other functions. The LIDAR sensor(s) 364 may be functional safety level ASIL B. In some examples, the vehicle 300 may include multiple LIDAR sensors 364 (e.g., two, four, six, etc.) that may use Ethernet (e.g., to provide data to a Gigabit Ethernet switch).

In some examples, the LIDAR sensor(s) 364 may be capable of providing a list of objects and their distances for a 360-degree field of view. Commercially available LIDAR sensor(s) 364 may have an advertised range of approximately 100m, with an accuracy of 2 cm-3 cm, and with support for a 100 Mbps Ethernet connection, for example. In some examples, one or more non-protruding LIDAR sensors 364 may be used. In such examples, the LIDAR sensor(s) 364 may be implemented as a small device that may be embedded into the front, rear, sides, and/or corners of the vehicle 300. The LIDAR sensor(s) 364, in such examples, may provide up to a 120-degree horizontal and 35-degree vertical field-of-view, with a 200m range even for low-reflectivity objects. Front-mounted LIDAR sensor(s) 364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 300. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 364 may be less susceptible to motion blur, vibration, and/or shock.

The vehicle may further include IMU sensor(s) 366. The IMU sensor(s) 366 may be located at a center of the rear axle of the vehicle 300, in some examples. The IMU sensor(s) 366 may include, for example and without limitation, an accelerometer(s), a magnetometer(s), a gyroscope(s), a magnetic compass(es), and/or other sensor types. In some examples, such as in six-axis applications, the IMU sensor(s) 366 may include accelerometers and gyroscopes, while in nine-axis applications, the IMU sensor(s) 366 may include accelerometers, gyroscopes, and magnetometers.

In some embodiments, the IMU sensor(s) 366 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 366 may enable the vehicle 300 to estimate heading without requiring input from a magnetic sensor by directly observing and correlating the changes in velocity from GPS to the IMU sensor(s) 366. In some examples, the IMU sensor(s) 366 and the GNSS sensor(s) 358 may be combined in a single integrated unit.

The vehicle may include microphone(s) 396 placed in and/or around the vehicle 300. The microphone(s) 396 may be used for emergency vehicle detection and identification, among other things.

The vehicle may further include any number of camera types, including stereo camera(s) 368, wide-view camera(s) 370, infrared camera(s) 372, surround camera(s) 374, long-range and/or mid-range camera(s) 398, and/or other camera types. The cameras may be used to capture image data around an entire periphery of the vehicle 300. The types of cameras used depends on the embodiments and require-ments for the vehicle 300, and any combination of camera types may be used to provide the necessary coverage around the vehicle 300. In addition, the number of cameras may differ depending on the embodiment. For example, the vehicle may include six cameras, seven cameras, ten cam-eras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 3A and FIG. 3B.

The vehicle 300 may further include vibration sensor(s) 342. The vibration sensor(s) 342 may measure vibrations of components of the vehicle, such as the axle(s). For example, changes in vibrations may indicate a change in road sur-faces. In another example, when two or more vibration sensors 342 are used, the differences between the vibrations may be used to determine friction or slippage of the road surface (e.g., when the difference in vibration is between a power-driven axle and a freely rotating axle).

The vehicle 300 may include an ADAS system 338. The ADAS system 338 may include a SoC, in some examples. The ADAS system 338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 360, LIDAR sensor(s) 364, and/or a camera(s). The ACC systems may include longitudinal ACC and/or lateral ACC. Longi-tudinal ACC monitors and controls the distance to the vehicle immediately ahead of the vehicle 300 and automati-cally adjust the vehicle speed to maintain a safe distance from vehicles ahead. Lateral ACC performs distance keep-ing, and advises the vehicle 300 to change lanes when necessary. Lateral ACC is related to other ADAS applica-tions such as LCA and CWS.

CACC uses information from other vehicles that may be received via the network interface 324 and/or the wireless antenna(s) 315 from other vehicles via a wireless link, or indirectly, over a network connection (e.g., over the Inter-net). Direct links may be provided by a vehicle-to-vehicle (V2V) communication link, while indirect links may be infrastructure-to-vehicle (I2V) communication link. In gen-eral, the V2V communication concept provides information about the immediately preceding vehicles (e.g., vehicles immediately ahead of and in the same lane as the vehicle 300), while the I2V communication concept provides infor-mation about traffic further ahead. CACC systems may include either or both I2V and V2V information sources. Given the information of the vehicles ahead of the vehicle 300, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 300 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 300 if the vehicle 300 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 360, coupled to a dedicated processor, DSP, FPGA, and/or ASIC, that is electrically coupled to driver feedback, such as a display, speaker, and/or vibrating component.

RCTW systems may provide visual, audible, and/or tac-tile notification when an object is detected outside the rear-camera range when the vehicle 300 is backing up. Some RCTW systems include AEB to ensure that the vehicle brakes are applied to avoid a crash. RCTW systems may use one or more rear-facing RADAR sensor(s) 360, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 300, the vehicle 300 itself must, in the case of conflicting results, decide whether to heed the result from a primary computer or a secondary computer (e.g., a first controller 336 or a second controller 336). For example, in some embodiments, the ADAS system 338 may be a backup and/or secondary computer for providing perception information to a backup computer rationality module. The backup computer rationality monitor may run a redundant diverse software on hardware components to detect faults in perception and dynamic driving tasks. Outputs from the ADAS system 338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 304.

In other examples, ADAS system 338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 338 may be fed into the primary computer's perception block and/or the primary computer's dynamic driving task block. For example, if the ADAS system 338 indicates a forward crash warning due to an object immediately ahead, the perception block may use this information when identifying objects. In other examples, the secondary computer may have its own neural network which is trained and thus reduces the risk of false positives, as described herein.

The vehicle 300 may further include the infotainment SoC 330 (e.g., an in-vehicle infotainment system (IVI)). Although illustrated and described as a SoC, the infotainment system may not be a SoC, and may include two or more discrete components. The infotainment SoC 330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 300. For example, the infotainment SoC 330 may radios, disk players, navigation systems, video players, USB and Bluetooth connectivity, carputers, in-car entertainment, Wi-Fi, steering wheel audio controls, hands free voice control, a heads-up display (HUD), an HMI display 334, a telematics device, a control panel (e.g., for controlling and/or interacting with various components, features, and/or systems), and/or other components. The infotainment SoC 330 may further be used to provide information (e.g., visual and/or audible) to a user(s) of the vehicle, such as information from the ADAS system 338, autonomous driving information such as planned vehicle maneuvers, trajectories, surrounding environment information (e.g., intersection information, vehicle information, road information, etc.), and/or other information.

The infotainment SoC 330 may include GPU functionality. The infotainment SoC 330 may communicate over the bus 302 (e.g., CAN bus, Ethernet, etc.) with other devices, systems, and/or components of the vehicle 300. In some examples, the infotainment SoC 330 may be coupled to a supervisory MCU such that the GPU of the infotainment system may perform some self-driving functions in the event that the primary controller(s) 336 (e.g., the primary and/or backup computers of the vehicle 300) fail. In such an example, the infotainment SoC 330 may put the vehicle 300 into a chauffeur to safe stop mode, as described herein.

The vehicle 300 may further include an instrument cluster 332 (e.g., a digital dash, an electronic instrument cluster, a digital instrument panel, etc.). The instrument cluster 332 may include a controller and/or supercomputer (e.g., a discrete controller or supercomputer). The instrument cluster 332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 330 and the instrument cluster 332. In other words, the instrument cluster 332 may be included as part of the infotainment SoC 330, or vice versa.

Figure 3D:
FIG. 3D is a system diagram for communication between cloud-based server(s) and the example autonomous vehicle of FIG. 3A, in accordance with some embodiments of the present disclosure.

FIG. 3D is a system diagram for communication between cloud-based server(s) and the example autonomous vehicle 300 of FIG. 3A, in accordance with some embodiments of the present disclosure. The system 376 may include server(s) 378, network(s) 390, and vehicles, including the vehicle 300. The server(s) 378 may include a plurality of GPUs 384(A)-384(H) (collectively referred to herein as GPUs 384), PCIe switches 382(A)-382(H) (collectively referred to herein as PCIe switches 382), and/or CPUs 380(A)-380(B) (collectively referred to herein as CPUs 380). The GPUs 384, the CPUs 380, and the PCIe switches may be interconnected with high-speed interconnects such as, for example and without limitation, NVLink interfaces 388 developed by NVIDIA and/or PCIe connections 386. In some examples, the GPUs 384 are connected via NVLink and/or NVSwitch SoC and the GPUs 384 and the PCIe switches 382 are connected via PCIe interconnects. Although eight GPUs 384, two CPUs 380, and two PCIe switches are illustrated, this is not intended to be limiting. Depending on the embodiment, each of the server(s) 378 may include any number of GPUs 384, CPUs 380, and/or PCIe switches. For example, the server(s) 378 may each include eight, sixteen, thirty-two, and/or more GPUs 384.

The server(s) 378 may receive, over the network(s) 390 and from the vehicles, image data representative of images showing unexpected or changed road conditions, such as recently commenced road-work. The server(s) 378 may transmit, over the network(s) 390 and to the vehicles, neural networks 392, updated neural networks 392, and/or map information 394, including information regarding traffic and road conditions. The updates to the map information 394 may include updates for the HD map 322, such as information regarding construction sites, potholes, detours, flooding, and/or other obstructions. In some examples, the neural networks 392, the updated neural networks 392, and/or the map information 394 may have resulted from new training and/or experiences represented in data received from any number of vehicles in the environment, and/or based on training performed at a datacenter (e.g., using the server(s) 378 and/or other servers).

The server(s) 378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 390, and/or the machine learning models may be used by the server(s) 378 to remotely monitor the vehicles.

In some examples, the server(s) 378 may receive data from the vehicles and apply the data to up-to-date real-time neural networks for real-time intelligent inferencing. The server(s) 378 may include deep-learning supercomputers and/or dedicated AI computers powered by GPU(s) 384, such as a DGX and DGX Station machines developed by NVIDIA. However, in some examples, the server(s) 378 may include deep learning infrastructure that use only CPU-powered datacenters.

The deep-learning infrastructure of the server(s) 378 may be capable of fast, real-time inferencing, and may use that capability to evaluate and verify the health of the processors, software, and/or associated hardware in the vehicle 300. For example, the deep-learning infrastructure may receive periodic updates from the vehicle 300, such as a sequence of images and/or objects that the vehicle 300 has located in that sequence of images (e.g., via computer vision and/or other machine learning object classification techniques). The deep-learning infrastructure may run its own neural network to identify the objects and compare them with the objects identified by the vehicle 300 and, if the results do not match and the infrastructure concludes that the AI in the vehicle 300 is malfunctioning, the server(s) 378 may transmit a signal to the vehicle 300 instructing a fail-safe computer of the vehicle 300 to assume control, notify the passengers, and complete a safe parking maneuver.

For inferencing, the server(s) 378 may include the GPU(s) 384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 4:
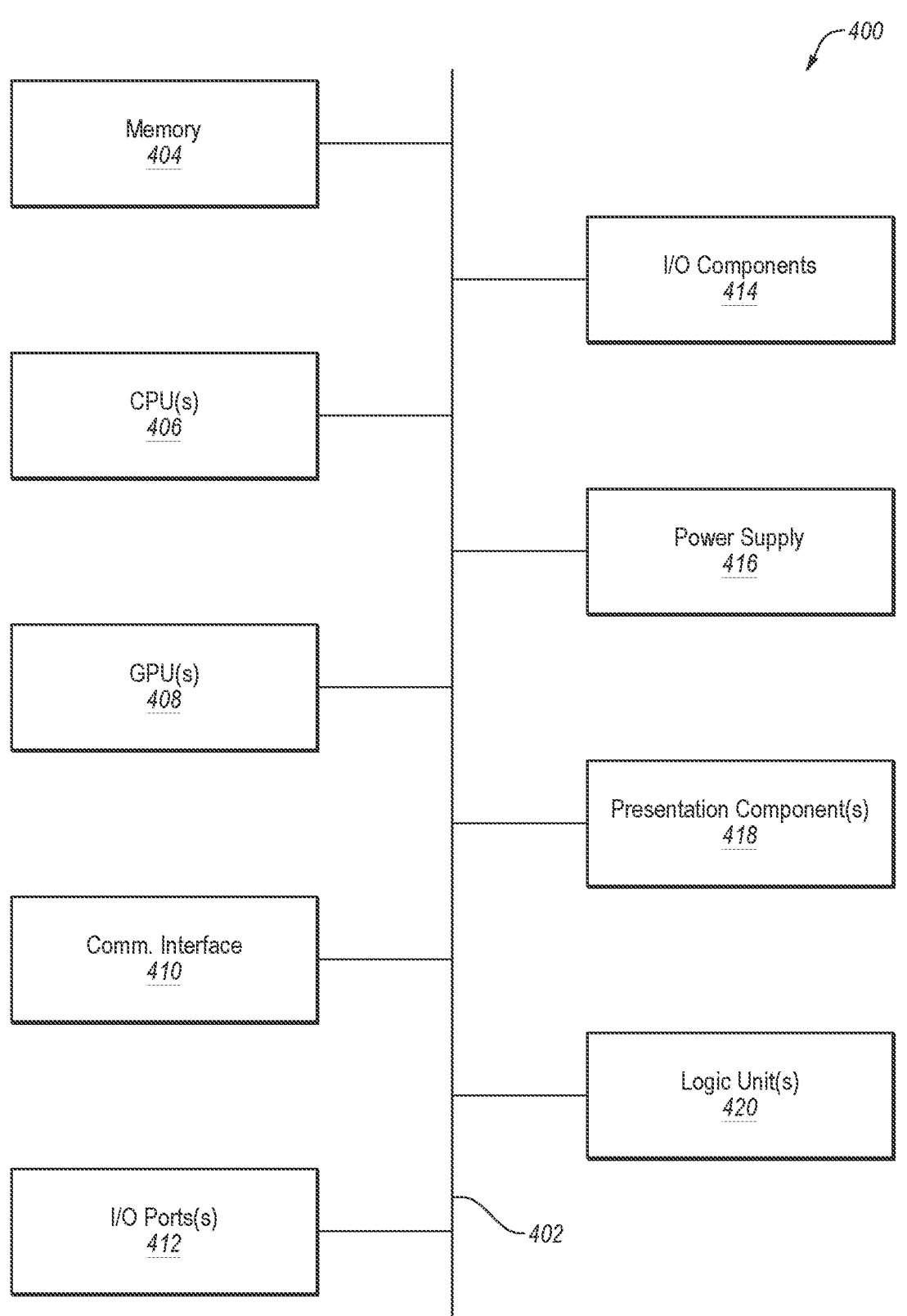
FIG. 4 is a block diagram of an example computing device suitable for use in implementing some embodiments of the present disclosure.

FIG. 4 is a block diagram of an example computing device(s) 400 suitable for use in implementing some embodiments of the present disclosure. Computing device 400 may include an interconnect system 402 that directly or indirectly couples the following devices: memory 404, one or more central processing units (CPUs) 406, one or more graphics processing units (GPUs) 408, a communication interface 410, input/output (I/O) ports 412, input/output components 414, a power supply 416, one or more presentation components 418 (e.g., display(s)), and one or more logic units 420. In at least one embodiment, the computing device(s) 400 may comprise one or more virtual machines (VMs), and/or any of the components thereof may comprise virtual components (e.g., virtual hardware components). For non-limiting examples, one or more of the GPUs 408 may comprise one or more vGPUs, one or more of the CPUs 406 may comprise one or more vCPUs, and/or one or more of the logic units 420 may comprise one or more virtual logic units. As such, a computing device(s) 400 may include discrete components (e.g., a full GPU dedicated to the computing device 400), virtual components (e.g., a portion of a GPU dedicated to the computing device 400), or a combination thereof.

Although the various blocks of FIG. 4 are shown as connected via the interconnect system 402 with lines, this is not intended to be limiting and is for clarity only. For example, in some embodiments, a presentation component 418, such as a display device, may be considered an I/O component 414 (e.g., if the display is a touch screen). As another example, the CPUs 406 and/or GPUs 408 may include memory (e.g., the memory 404 may be representative of a storage device in addition to the memory of the GPUs 408, the CPUs 406, and/or other components). In other words, the computing device of FIG. 4 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 4.

The interconnect system 402 may represent one or more links or busses, such as an address bus, a data bus, a control bus, or a combination thereof. The interconnect system 402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 406 may be directly connected to the memory 404. Further, the CPU 406 may be directly connected to the GPU 408. Where there is direct, or point-to-point connection between components, the interconnect system 402 may include a PCIe link to carry out the connection. In these examples, a PCI bus need not be included in the computing device 400.

The memory 404 may include any of a variety of computer-readable media. The computer-readable media may be any available media that may be accessed by the computing device 400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 406 may be configured to execute at least some of the computer-readable instructions to control one or more components of the computing device 400 to perform one or more of the methods and/or processes described herein. The CPU(s) 406 may each include one or more cores (e.g., one, two, four, eight, twenty-eight, seventy-two, etc.) that are capable of handling a multitude of software threads simultaneously. The CPU(s) 406 may include any type of processor, and may include different types of processors depending on the type of computing device 400 implemented (e.g., processors with fewer cores for mobile devices and processors with more cores for servers). For example, depending on the type of computing device 400, the processor may be an Advanced RISC Machines (ARM) processor implemented using Reduced Instruction Set Computing (RISC) or an x86 processor implemented using Complex Instruction Set Computing (CISC). The computing device 400 may include one or more CPUs 406 in addition to one or more microprocessors or supplementary co-processors, such as math co-processors.

In addition to or alternatively from the CPU(s) 406, the GPU(s) 408 may be configured to execute at least some of the computer-readable instructions to control one or more components of the computing device 400 to perform one or more of the methods and/or processes described herein. One or more of the GPU(s) 408 may be an integrated GPU (e.g., with one or more of the CPU(s) 406 and/or one or more of the GPU(s) 408 may be a discrete GPU. In embodiments, one or more of the GPU(s) 408 may be a coprocessor of one or more of the CPU(s) 406. The GPU(s) 408 may be used by the computing device 400 to render graphics (e.g., 3D graphics) or perform general purpose computations. For example, the GPU(s) 408 may be used for General-Purpose computing on GPUs (GPGPU). The GPU(s) 408 may include hundreds or thousands of cores that are capable of handling hundreds or thousands of software threads simultaneously. The GPU(s) 408 may generate pixel data for output images in response to rendering commands (e.g., rendering commands from the CPU(s) 406 received via a host interface). The GPU(s) 408 may include graphics memory, such as display memory, for storing pixel data or any other suitable data, such as GPGPU data. The display memory may be included as part of the memory 404. The GPU(s) 408 may include two or more GPUs operating in parallel (e.g., via a link). The link may directly connect the GPUs (e.g., using NVLINK) or may connect the GPUs through a switch (e.g., using NVSwitch). When combined together, each GPU 408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 406 and/or the GPU(s) 408, the logic unit(s) 420 may be configured to execute at least some of the computer-readable instructions to control one or more components of the computing device 400 to perform one or more of the methods and/or processes described herein. In embodiments, the CPU(s) 406, the GPU(s) 408, and/or the logic unit(s) 420 may discretely or jointly perform any combination of the methods, processes and/or portions thereof. One or more of the logic units 420 may be part of and/or integrated in one or more of the CPU(s) 406 and/or the GPU(s) 408 and/or one or more of the logic units 420 may be discrete components or otherwise external to the CPU(s) 406 and/or the GPU(s) 408. In embodiments, one or more of the logic units 420 may be a coprocessor of one or more of the CPU(s) 406 and/or one or more of the GPU(s) 408.

Examples of the logic unit(s) 420 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 410 may include one or more receivers, transmitters, and/or transceivers that enable the computing device 400 to communicate with other computing devices via an electronic communication network, included wired and/or wireless communications. The communication interface 410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 420 and/or communication interface 410 may include one or more data processing units (DPUs) to transmit data received over a network and/or through interconnect system 402 directly to (e.g., a memory of) one or more GPU(s) 408.

The I/O ports 412 may enable the computing device 400 to be logically coupled to other devices including the I/O components 414, the presentation component(s) 418, and/or other components, some of which may be built in to (e.g., integrated in) the computing device 400. Illustrative I/O components 414 include a microphone, mouse, keyboard, joystick, game pad, game controller, satellite dish, scanner, printer, wireless device, etc. The I/O components 414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 400. The computing device 400 may be include depth cameras, such as stereoscopic camera systems, infrared camera systems, RGB camera systems, touchscreen technology, and combinations of these, for gesture detection and recognition. Additionally, the computing device 400 may include accelerometers or gyroscopes (e.g., as part of an inertia measurement unit (IMU)) that enable detection of motion. In some examples, the output of the accelerometers or gyroscopes may be used by the computing device 400 to render immersive augmented reality or virtual reality.

The power supply 416 may include a hard-wired power supply, a battery power supply, or a combination thereof. The power supply 416 may provide power to the computing device 400 to enable the components of the computing device 400 to operate.

The presentation component(s) 418 may include a display (e.g., a monitor, a touch screen, a television screen, a heads-up-display (HUD), other display types, or a combination thereof), speakers, and/or other presentation components. The presentation component(s) 418 may receive data from other components (e.g., the GPU(s) 408, the CPU(s) 406, DPUs, etc.), and output the data (e.g., as an image, video, sound, etc.).

Example Data Center

Figure 5:
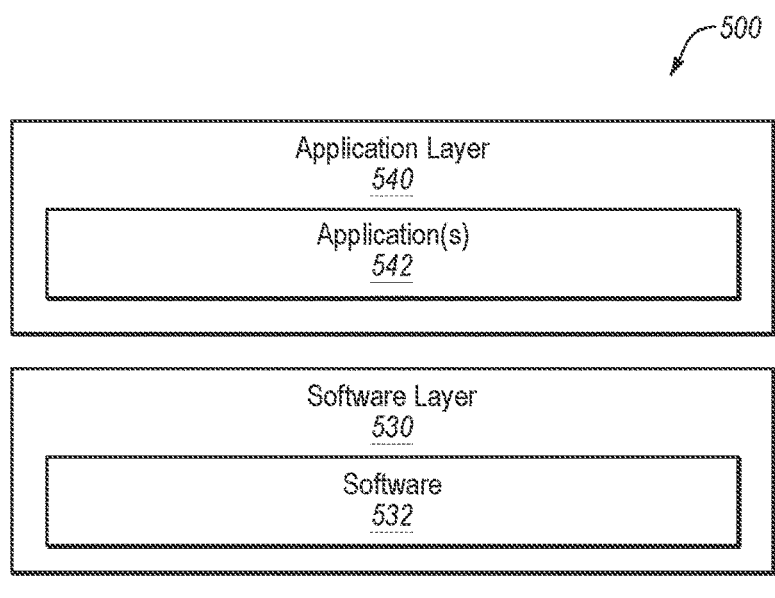
FIG. 5 is a block diagram of an example data center suitable for use in implementing some embodiments of the present disclosure.
Figure 5:
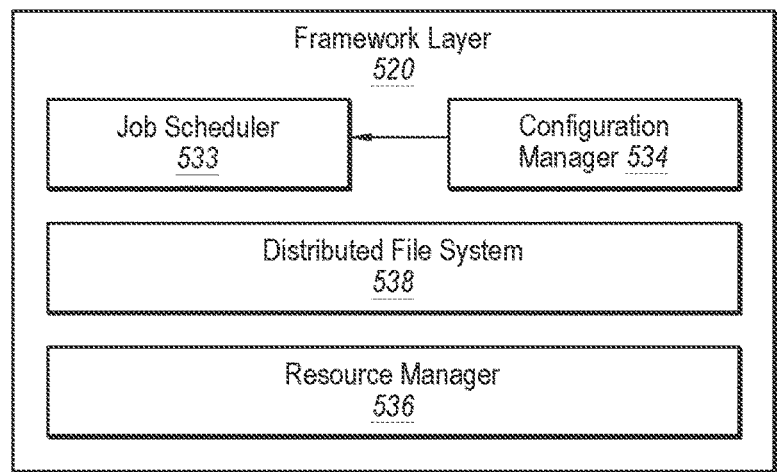
Figure 5:
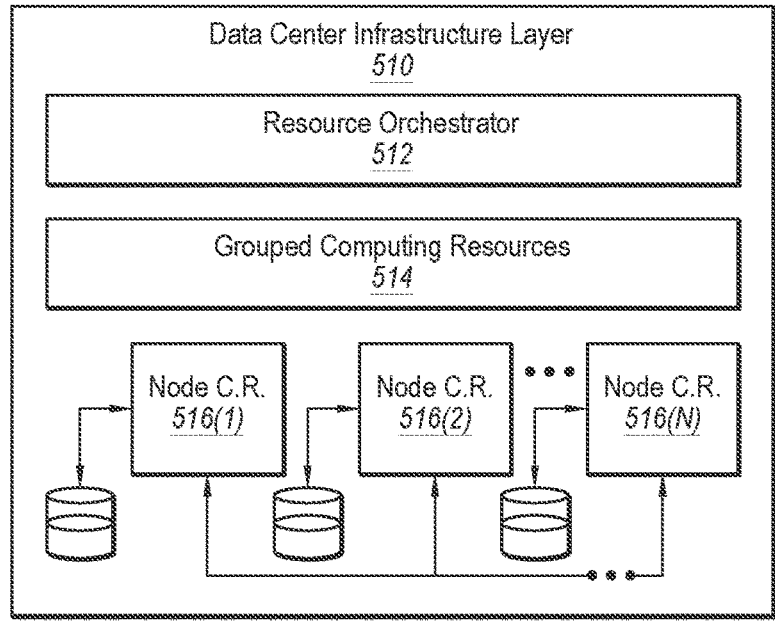

FIG. 5 illustrates an example data center 500 that may be used in at least one embodiments of the present disclosure. The data center 500 may include a data center infrastructure layer 510, a framework layer 520, a software layer 530, and/or an application layer 540.

As shown in FIG. 5, the data center infrastructure layer 510 may include a resource orchestrator 512, grouped computing resources 514, and node computing resources ("node C.R.s") 516(1)-516(N), where "N" represents any whole, positive integer. In at least one embodiment, node C.R.s 516(1)-516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 516(1)-516(N) may correspond to a server having one or more of the above-mentioned computing resources. In addition, in some embodiments, the node C.R.s 516(1)-516(N) may include one or more virtual components, such as vGPUs, vCPUs, and/or the like, and/or one or more of the node C.R.s 516(1)-516(N) may correspond to a virtual machine (VM).

In at least one embodiment, grouped computing resources 514 may include separate groupings of node C.R.s 516 housed within one or more racks (not shown), or many racks housed in data centers at various geographical locations (also not shown). Separate groupings of node C.R.s 516 within grouped computing resources 514 may include grouped compute, network, memory or storage resources that may be configured or allocated to support one or more workloads. In at least one embodiment, several node C.R.s 516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 512 may configure or otherwise control one or more node C.R.s 516(1)-516(N) and/or grouped computing resources 514. In at least one embodiment, resource orchestrator 512 may include a software design infrastructure (SDI) management entity for the data center 500. The resource orchestrator 512 may include hardware, software, or some combination thereof.

In at least one embodiment, as shown in FIG. 5, framework layer 520 may include a job scheduler 532, a configuration manager 534, a resource manager 536, and/or a distributed file system 538. The framework layer 520 may include a framework to support software 532 of software layer 530 and/or one or more application(s) 542 of application layer 540. The software 532 or application(s) 542 may respectively include web-based service software or applications, such as those provided by Amazon Web Services, Google Cloud and Microsoft Azure. The framework layer 520 may be, but is not limited to, a type of free and open-source software web application framework such as Apache Spark™ (hereinafter "Spark") that may utilize distributed file system 538 for large-scale data processing (e.g., "big data"). In at least one embodiment, job scheduler 532 may include a Spark driver to facilitate scheduling of workloads supported by various layers of data center 500. The configuration manager 534 may be capable of configuring different layers such as software layer 530 and framework layer 520 including Spark and distributed file system 538 for supporting large-scale data processing. The resource manager 536 may be capable of managing clustered or grouped computing resources mapped to or allocated for support of distributed file system 538 and job scheduler 532. In at least one embodiment, clustered or grouped computing resources may include grouped computing resource 514 at data center infrastructure layer 510. The resource manager 536 may coordinate with resource orchestrator 512 to manage these mapped or allocated computing resources.

In at least one embodiment, software 532 included in software layer 530 may include software used by at least portions of node C.R.s 516(1)-516(N), grouped computing resources 514, and/or distributed file system 538 of framework layer 520. One or more types of software may include, but are not limited to, Internet web page search software, e-mail virus scan software, database software, and streaming video content software.

In at least one embodiment, application(s) 542 included in application layer 540 may include one or more types of applications used by at least portions of node C.R.s 516(1)-516(N), grouped computing resources 514, and/or distributed file system 538 of framework layer 520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 534, resource manager 536, and resource orchestrator 512 may implement any number and type of self-modifying actions based on any amount and type of data acquired in any technically feasible fashion. Self-modifying actions may relieve a data center operator of data center 500 from making possibly bad configuration decisions and possibly avoiding underutilized and/or poor performing portions of a data center.

The data center 500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 500. In at least one embodiment, trained or deployed machine learning models corresponding to one or more neural networks may be used to infer or predict information using resources described in the present disclosure with respect to the data center 500 by using weight parameters calculated through one or more training techniques, such as but not limited to those described herein.

In at least one embodiment, the data center 500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 400 of FIG. 4—e.g., each device may include similar components, features, and/or functionality of the computing device(s) 400. In addition, where backend devices (e.g., servers, NAS, etc.) are implemented, the backend devices may be included as part of a data center 500, an example of which is described in more detail herein with respect to FIG. 5.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 400 described herein with respect to FIG. 4. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to cause performance of operations comprising:

determining an observed state of the system based at least on sensor data directly indicating a state of the system and generated using one or more sensors of the system;

determining an estimated state of the system based at least on measurement data measuring one or more characteristics that are intrinsic to the system, the measurement data indirectly indicating the state of the system;

generating disturbance data based at least on a difference between one or more characteristics of the estimated state of the system and the same one or more characteristics of the observed state of the system;

updating one or more disturbance terms of a state space formulation based at least on the disturbance data; and generating, based at least on the state space formulation, a control command that directs one or more operations of the system according to plan data indicative of a plan for completing one or more tasks of the system.

2. The system of claim 1, wherein:

the plan data is formatted as a first matrix in the state space formulation;

the sensor data is formatted as a second matrix in the state space formulation;

the disturbance data is formatted as a third matrix in the state space formulation; and the generating of the control command is based at least on processing the first matrix, the second matrix, and the third matrix.

3. The system of claim 2, wherein the processing of the first matrix, the second matrix, and the third matrix is using at least one of a model predictive control ("MPC") algorithm or a linear-quadratic regulator ("LQR") algorithm.

4. The system of claim 1, wherein the measurement data includes at least one of a steering angle, an axle curvature, a brake pedal force, or a gas pedal force.

5. The system of claim 1, wherein the observed state of the system is determined based at least on observed measurement data that directly indicates one or more characteristics of the system, the observed measurement data determined using, at least, the sensor data.

6. The system of claim 5, wherein the one or more characteristics includes at least one of a position, a speed, a lateral acceleration, or a yaw rate.

7. A system comprising:

one or more processing units to cause performance of operations comprising:

generating disturbance data based at least on one or more differences between a predicted state of a system and an observed state of the system, the predicted state of the system being determined based on measurement data measuring one or more characteristics that are intrinsic to the system, the measurement data indirectly indicating a state of the system and the observed state of the system being determined based at least on sensor data generated using one or more sensors of the system; and generating, based at least on the disturbance data, a control command that directs one or more operations of the system according to plan data indicative of a plan for completing one or more tasks of the system.

8. The system of claim 7, wherein:

the plan data is formatted as a first matrix;

the sensor data is formatted as a second matrix;

the disturbance data is formatted as a third matrix; and the generating of the control command is based at least on processing the first matrix, the second matrix, and the third matrix using one or more algorithms.

9. The system of claim 8, wherein the one or more algorithms include at least one of a model predictive control ("MPC") algorithm or a linear-quadratic regulator ("LQR") algorithm.

10. The system of claim 7, wherein the predicted state of the system is determined based additionally on a system model.

11. The system of claim 10, wherein the measurement data measuring one or more characteristics that are intrinsic to the system includes at least one of a steering angle, an axle curvature, a brake pedal force, or a gas pedal force.

12. The system of claim 7, wherein the observed state of the system is determined based at least on observed measurement data that directly indicates one or more characteristics of the system, the observed measurement data determined, at least, using the sensor data.

13. The system of claim 12, wherein the one or more characteristics includes at least one of a position, a speed, an acceleration, or a yaw rate.

14. The system of claim 7, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

15. A processor comprising processing circuitry to perform operations comprising:

generating disturbance data based at least on comparing an estimated state of a system and an observed state of the system, the estimated state of the system determined based at least on measurement data measuring one or more characteristics that are intrinsic to the system, the measurement data indirectly indicating a state of the system;

processing the disturbance data, observed state data corresponding to the observed state, and plan data indicative of a plan for performing one or more tasks of the system to predict a future state of the system; and generating a control command that directs one or more operations of the system associated with the one or more tasks based at least on the future state as predicted.

16. The processor of claim 15, wherein:

the plan data is formatted as a first matrix;

the observed state data is formatted as a second matrix;

the disturbance data is formatted as a third matrix; and the predicting of the future state is based at least on solving the first matrix, the second matrix, and the third matrix.

17. The processor of claim 16, wherein the solving of the first matrix, the second matrix, and the third matrix is based at least on one or more of a model predictive control ("MPC") algorithm or a linear-quadratic regulator ("LQR") algorithm.

18. The processor of claim 15, wherein the control command accounts for the disturbance data.

19. The processor of claim 15, wherein the observed state of the system is determined based at least on observed measurement data that directly indicates a state of the system.

* * * * *